United States Patent
Delahaye et al.

(10) Patent No.: US 12,466,915 B2
(45) Date of Patent: Nov. 11, 2025

(54) METHOD TO PREPARE A PRECURSOR FOR A POLYMER OR TO PREPARE A POLYMER COMPRISING AT LEAST ONE UNIT HAVING A TERTIARY AMINE AND A PENDANT CARBOXYL GROUP AND A PRECURSOR OR POLYMER COMPRISING SUCH UNIT

(71) Applicant: Universiteit Gent, Ghent (BE)

(72) Inventors: Maarten Delahaye, Ghent (BE); Johan Winne, Melle (BE); Filip du Prez, Ghent (BE)

(73) Assignee: Universiteit Gent, Ghent (BE)

( * ) Notice: Subject to any disclaimer, the term of this patent is extended or adjusted under 35 U.S.C. 154(b) by 761 days.

(21) Appl. No.: 17/754,653

(22) PCT Filed: Oct. 15, 2020

(86) PCT No.: PCT/EP2020/079037
§ 371 (c)(1),
(2) Date: Apr. 8, 2022

(87) PCT Pub. No.: WO2021/074290
PCT Pub. Date: Apr. 22, 2021

(65) Prior Publication Data
US 2024/0101757 A1    Mar. 28, 2024

(30) Foreign Application Priority Data
Oct. 16, 2019  (EP) .................................... 19203478

(51) Int. Cl.
*C08G 63/685*    (2006.01)
(52) U.S. Cl.
CPC ................. *C08G 63/6856* (2013.01)
(58) Field of Classification Search
CPC ................................................ C08G 63/6856
See application file for complete search history.

(56) References Cited

U.S. PATENT DOCUMENTS 5,354,840 A    10/1994   Odell

FOREIGN PATENT DOCUMENTS

| CN | 107759480 A | * 3/2018 |
| FR | 1089645 A | 3/1955 |

(Continued)

OTHER PUBLICATIONS

English Translation of CN-107759480 (Year: 2018).*
English Translation of JP 2015074660 (Year: 2015).*

*Primary Examiner* — Catherine S Branch
*Assistant Examiner* — Andrea Wu
(74) *Attorney, Agent, or Firm* — Ipsilon USA—NLO

(57) ABSTRACT

The invention relates to a method to prepare a precursor for a polymer or to prepare a polymer, the polymer comprising at least one unit of formula (I) or at least one unit of formula (II) having a tertiary amine and a pendant carboxyl group (I)

(II)

(Continued)

Furthermore the invention relates to a precursor or polymer comprising at least one unit of formula (I) and/or at least one unit of formula (II) and to the use of such precursor or such polymer in extrusion, injection moulding, compression moulding, transfer moulding, foam moulding, thermoforming, rotation moulding or 3D printing.

7 Claims, 9 Drawing Sheets

(56) References Cited

FOREIGN PATENT DOCUMENTS

| | | | |
|---|---|---|---|
| JP | 2015074660 A | * | 4/2015 |
| WO | 2018028365 A1 | | 2/2018 |

* cited by examiner

METHOD TO PREPARE A PRECURSOR FOR A POLYMER OR TO PREPARE A POLYMER COMPRISING AT LEAST ONE UNIT HAVING A TERTIARY AMINE AND A PENDANT CARBOXYL GROUP AND A PRECURSOR OR POLYMER COMPRISING SUCH UNIT

FIELD OF THE INVENTION

The present invention relates to a method to prepare a precursor for a polymer or to prepare a polymer whereby the polymer comprises at least one unit having a tertiary amine and a pendant carboxyl group. The invention further relates to a precursor and to a polymer comprising at least one unit having a tertiary amine and a pendant carboxyl group. The precursor or the polymer allows to form a network, for example a network with exchangeable chemical bonds. The polymer according to the present invention is recyclable and (re)processable.

BACKGROUND ART

Thermosets comprise polymeric chains linked together by covalent chemical bonds. Because of their dimensional stability, mechanical properties and chemical resistance, thermosets are the materials of choice for numerous applications. However, as a result of their permanent molecular architecture, thermosets cannot be reshaped, processed or recycled after cross-linking or curing. Thermosets as for example epoxy resins or methacrylic networks are typically prepared via injection moulding, immediately in their definitive shape, and once cured, their shape cannot be changed.

An attractive chemical strategy to introduce plasticity in cross-linked polymer networks is offered by the introduction of exchangeable chemical bonds, leading to dynamic cross-links. If chemical cross-links can be efficiently and reliably exchanged between different positions of the organic polymer chains, macroscopic flow can be achieved without risking structural damage or permanent loss of material properties. Polymer networks containing such exchangeable bonds are also known as covalent adaptable networks or CANs. CANs may be classified into two groups depending on their exchange mechanism. The first group of CANs makes use of a dissociative cross-link exchange mechanism. In a dissociative exchange, chemical bonds are first broken and then formed again at another place. An example comprises the Diels-Alder reaction between furans and maleides. The second group of CANs makes use of an associative bond exchange mechanism. In an associative exchange, a new bond is always formed before the original bond is broken.

Transesterification based CANs excel in availability of monomers and ease of synthesis, which makes them interesting for industrial application. However, processing of CANs is only industrial relevant if fast exchange results in low material viscosities. Existing dynamic chemistry platforms do not show a sufficiently high exchange rate to allow industrial relevant processing of CANs.

To achieve a swift exchange reaction in CANs, in order to allow macroscopic flow at useful temperature, often a highly active catalyst needs to be included as a material additive such as Lewis acids, BrØnsted acids, transition metals, strong bases or nucleophilic catalysts which can lower the activation energy of the exchange reaction. However, catalytic additives can result in problems with catalyst aging, and thus, in a deterioration of material properties over time.

As another major strategy to achieve rapid exchange kinetics in CANs, intrinsically reactive linking groups have been introduced in CANs that are reactive even in the absence of a catalyst. However, such reactive moieties are often also sensitive to hydrolysis, oxidation or other degradation reactions. Examples comprise networks that incorporate maleimides, phosphines, thiols and (di)sulfides, imines, or free amines.

Recently, it was shown that transesterification was possible without the need of an external catalyst or additive (J. Am. Chem. Soc. 2019, 141, 38) by internal catalysis of a pendant carboxylic phthalate acid causing a neighbouring group participation (NGP) effect. Although such materials could be processed and recycled, the exchange kinetics were not sufficiently fast for industrial processing techniques. Preparation of monophthalate containing networks starting from bisfunctional anhydrides and a mixture of diol(s) and triol(s) have a relaxation time of 60 seconds at 180° C. However, industrial relevant processing techniques require relaxation times of a couple of seconds or even lower.

SUMMARY OF THE INVENTION

It is an object of the present invention to provide a method to prepare a precursor for a polymer or to prepare a polymer avoiding the previously described drawbacks.

It is another object of the present invention to provide a method to prepare a precursor for a polymer or a polymer suitable to form a covalent adaptable network not requiring an external catalyst.

It is another object of the present invention to provide a method to prepare a precursor for a polymer or a polymer having at least one unit comprising a tertiary amine and a pendant carboxyl group.

It is a further object of the present invention to provide a method to prepare a precursor for a polymer or a polymer suitable to form networks, for example covalent adaptable networks.

It is a further object of the present invention to provide a precursor or polymer having a low relaxation time so that the precursor or polymer is suitable for industrial applications.

It is still a further object of the present invention to provide a precursor for a polymer or a polymer suitable for use in processing techniques as for example in extrusion, injection moulding, compression moulding, transfer moulding, foam moulding, thermoforming, rotation moulding and 3D printing.

It is a further object of the present invention to provide a precursor for a polymer or a polymer that is recyclable.

According to a first aspect of the present invention a method to prepare a polymer or a precursor for a polymer is provided. The method is in particular suitable to prepare a polymer forming a network, for example a covalent adaptable network or to prepare a precursor for a polymer forming a network, for example a covalent adaptable network.

The method according to the present invention comprises the steps of a) providing at least one compound Y comprising a first functional group and a second functional group.

The first functional group comprises an anhydride group, preferably a cyclic anhydride group, a pair of carboxyl groups or a pair of derivatives of a carboxyl group. The anhydride group, the pair of carboxyl groups or the pair of derivatives of a carboxyl group of the first functional group comprises a first carbonyl group and a second carbonyl group, a first carbon atom positioned next to the first carbonyl group, a second carbon atom, positioned next to the second carbonyl group and optionally a third carbon atom positioned between the first carbon atom and the second carbon atom.

The first carbon atom, the second carbon atom and the optional third carbon atom can be substituted or unsubstituted.

The second functional group comprises a polymerisable group P1.

In case an unsaturated bond is present between the first carbon atom and the second carbon atom of the first functional group, this unsaturated bond between the first carbon atom and the second carbon atom is not considered as a polymerisable group P1 of the second functional group. In case the bond between the first carbon atom and the second carbon atom is part of a cyclic or aromatic structure comprising an unsaturated bond in this cyclic or aromatic structure, this unsaturated bond present in this cyclic or aromatic structure is not considered as a polymerisable group P1 of the second functional group;

b) providing an alcohol Z or a mixture of alcohols (for example polyols) comprising alcohol Z or reacted with alcohol Z. The alcohol Z comprises at least one hydroxyl functional group and at least one polymerisable group P2. The alcohol Z further comprises a nitrogen atom having three substituents, each of the three substituents comprising at least one carbon atom. Furthermore, the alcohol Z comprises a first carbon atom, a second carbon atom and optionally a third carbon atom between the nitrogen (having the three substituents) and the at least one of hydroxyl functional group of the alcohol Z. The first carbon atom, the second carbon atom and the optional third carbon atom can be substituted or non-substituted;

c) contacting said compound Y provided in step a) and said alcohol Z or said mixture of alcohols provided in step b).

For the purpose of this invention, a polymerisable group may comprise any type of group that can be polymerized and comprises for example an unsaturated carbon-carbon bond, a carboxyl group, a derivative of a carboxyl group or a hydroxyl functional group. For the purpose of this invention the terms 'polymerisable group' and 'group able to polymerise' are interchangeable.

Derivatives of a carboxyl group comprise for example acyl halides (—COX, with X being a halogen), esters (—COR) and carboxylic anhydrides.

Compound Y

As mentioned above, compound Y comprises at least a first functional group and a second functional group. Possibly, compound Y may comprise one or more further functional groups as for example a third functional group and/or a fourth functional group and/or further functional groups. The further functional group or groups may comprise any type of functional group, for example but not limited to a group comprising a polymerisable group Pn.

The first functional group comprises an anhydride group, preferably a cyclic anhydride group, a pair of carboxyl groups or a pair of derivatives of a carboxyl group.

The anhydride group, preferably the cyclic anhydride group, the pair of carboxyl groups or the pair of derivatives of a carboxyl group comprises two carbon atoms (i.e. a first carbon atom and a second carbon atom, whereby each of the first carbon atom and the second carbon atom can be independently of each other substituted or non-substituted) or at least two carbon atoms (i.e. at least a first carbon atom and a second carbon atom, whereby each of the first carbon atom and the second carbon atom can be independently of each other substituted or non-substituted) between the two carbonyl groups (i.e. between the first carbonyl group and the second carbonyl group) of the anhydride group, between the two carbonyl groups of a pair of carboxyl groups or between two carbonyl groups of a pair of derivatives of a carboxyl group. Preferably, the anhydride group, the pair of carboxyl groups or the pair of derivatives of a carboxyl group of the first functional group comprises two carbon atoms (i.e. a first carbon atom and a second carbon atom) or three carbon atoms (i.e. a first carbon atom, a second carbon atom and a third carbon atom, whereby the third carbon atom is positioned between the first carbon atom and the second carbon atom and whereby the first carbon atom, the second carbon and the third carbon atom are independently from each other substituted or non-substituted) between the two carbonyl groups of the anhydride group or between the two carbonyl groups of a pair of carboxyl groups or between the two carbonyl groups of a pair of derivatives of a carboxyl group. Most preferably, the anhydride group, the pair of carboxyl groups or the pair of derivatives of a carboxyl groups of the first functional group has two carbon atoms (i.e. a first carbon atom and a second carbon atom) between the two carbonyl groups of the anhydride group or between the two carbonyl groups of a pair of carboxyl groups or between the two carbonyl groups of a pair of derivatives of a carboxyl group.

The bond between the first carbon atom and the second carbon atom can be a saturated or unsaturated bond or can be part of an aromatic or a cyclic structure. In case the first functional group comprises three carbon atoms between the two carbonyl functions, the bond between these carbon atoms (i.e. the bond between the first carbon atom and the third carbon atom an the bond between the third carbon atom and the second carbon atom) can be saturated or unsaturated or one or more of the three carbon atoms can be part of an aromatic or cyclic structure.

As mentioned above in case compound Y has an unsaturated bond (double bond) between the first carbon atom and the second carbon atom of the first functional group, this saturated bond is not considered as polymerisable group P1 of the second functional group. This does not exclude that compound Y comprises an unsaturated bond between the first carbon atom and the second carbon of the first functional group, however, if present, such unsaturated bond is not considered as polymerisable group P1 of the second functional group.

Similarly, in case the bond between the first carbon atom and the second carbon atom is part of a cyclic or aromatic structure comprising an unsaturated bond in this cyclic or aromatic structure, such unsaturated bond present in this cyclic or aromatic structure is not considered as a second functional group. Similarly, this does not exclude that compound Y comprises an unsaturated bond in a cyclic or aromatic structure, however, if present such unsaturated bond is not considered as polymerisable group P1 of the second functional group.

Preferred polymerisable groups P1 of the second functional group of compound Y comprise any group comprising or consisting of an unsaturated carbon-carbon bond (double or triple bond), a carboxyl group, a derivative of a carboxyl group, an anhydride group or a pair of carboxyl groups (or derivatives of a carboxyl group). Particularly preferred polymerisable groups P1 comprise an anhydride group or a pair of carboxyl groups (or derivatives of a carboxyl group).

Preferred examples of compound Y are monoanhydride monomers having an anhydride group, preferably a cyclic anhydride group, as first functional group and a polymerisable group P1 (for example an unsaturated carbon-carbon bond) as second functional group. A preferred example is given below:

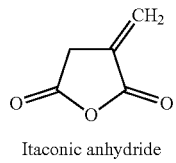

Itaconic anhydride

A preferred example of compound Y having a pair of carboxyl groups or a pair of derivatives of a carboxyl group as first functional group and a polymerisable group P1 as second functional group is the above mentioned monoanhydride monomer having a pair of carboxyl groups (or derivatives thereof) instead of the anhydride functional group.

Other preferred examples of compound Y have a first functional group and a second functional group that are independently from each other an anhydride group, a pair of carboxyl groups or a pair of derivatives of a carboxyl group. At least one of the first functional group or the second functional groups comprises at least two carbon atoms (substituted or non-substituted), preferably two or three carbon atoms, most preferably two carbon atoms, between two carbonyl groups of an anhydride group or at least two carbon atoms (substituted or non-substituted), preferably two or three carbon atoms, most preferably two carbon atoms between two carbonyl groups of a pair of carboxyl groups or between two carbonyl groups of derivatives of a carboxyl group.

In more preferred embodiments compound Y comprises a first functional group and a second functional group that are independently from each other an anhydride group, a pair of carboxyl groups or a pair of derivatives of a carboxyl group, whereby both the first functional group and the second functional group comprises at least two carbon atoms (substituted or non-substituted), preferably two or three carbon atoms, most preferably two carbon atoms between two carbonyl groups of an anhydride group or at least two carbon atoms (substituted or non-substituted), preferably two or three carbon atoms, most preferably two carbon atoms between two carbonyl groups of a pair of carboxyl groups or derivatives of a carboxyl group or between two carbonyl groups of a pair of derivatives of a carboxyl group.

Preferred examples of compound Y comprise a first anhydride group and a second anhydride group (as first functional group and as second functional group) with two or three carbon atoms (substituted or non-substituted), preferably two carbon atoms, between the carbonyl groups of the first anhydride group and with two or three carbon atoms, preferably two carbon atoms, between the carbonyl groups of the second anhydride group. The two or three carbon atoms between two carbonyl groups can be substituted or non-substituted. The bond between these two or three carbon atoms can be a saturated bond, an unsaturated bond or can be part of an aromatic or cyclic structure.

Some preferred bis- or polyanhydrides comprising two or more cyclic anhydride groups are given below:

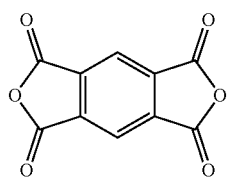

Pyromellitic dianhydride

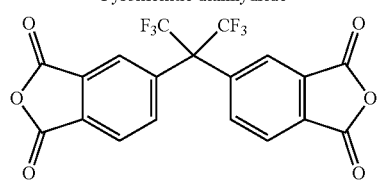

2,2-Bis(3,4-dicarboxyphenyl)-1,1,1,3,3,3-hexafluoropropane dianhydride

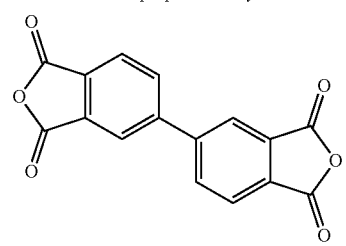

3,3',4,4'-Biphenyltetracarboxylic dianhydride

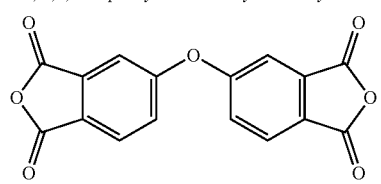

4,4'-Oxydiphthalic anhydride

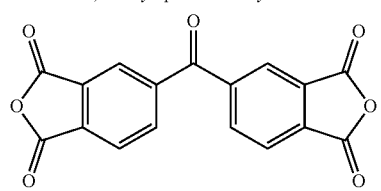

Benzophenone-3,3',4,4'-tetracarboxylic dianhydride

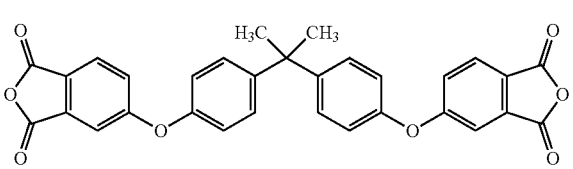

4,4'-(4,4'-Isopropylidenediphenoxy)bis(phthalic anhydride)

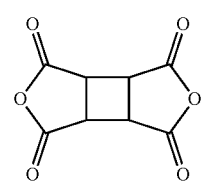

Cyclobutane-1,2,3,4-tetracarboxylic dianhydride

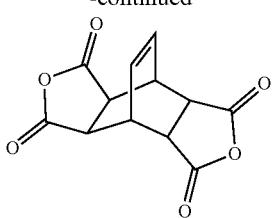

Bicyclo[2.2.2]oct-7-ene-2,3,5,6-tetracarboxylic dianhydride

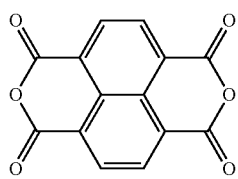

1,4,5,8-Naphthalenetetracarboxylic dianhydride

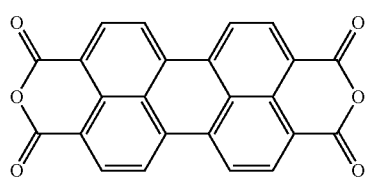

Perylene-3,4,9,10-tetracarboxylic dianhydride

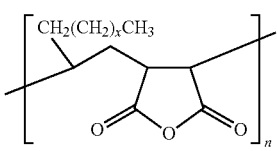

Poly(maleic anhydride-alt-1-octadecene)

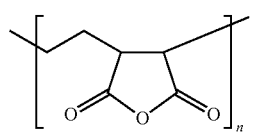

Poly(ethylene-alt-maleic anhydride)

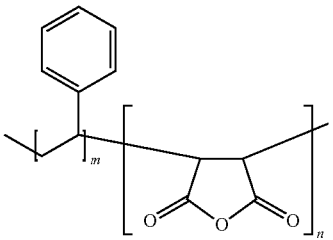

Poly(Styrene-co-Maleic Anhydride)

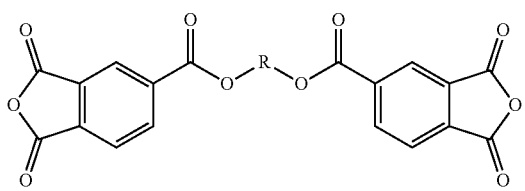

Bifunctional anhydrides*

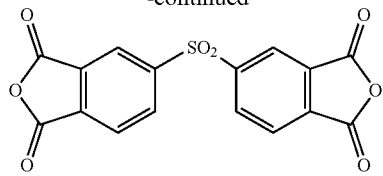

3,3',4,4'-Diphenylsulfonetetracarboxylic Dianhydride

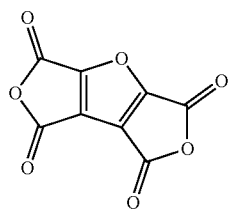

Difuro[3,4-b:3',4'-d]furan-1,3,5,7-tetrone*

*R comprises for example

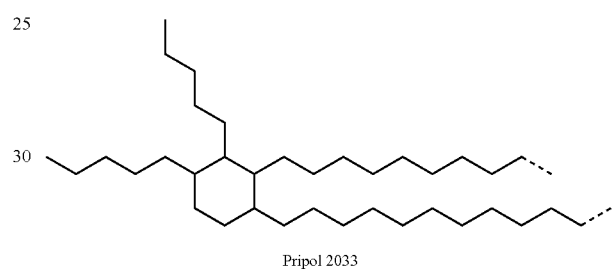

Pripol 2033

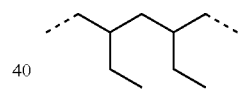

2,4-Diethyl-1,5-pentanediol

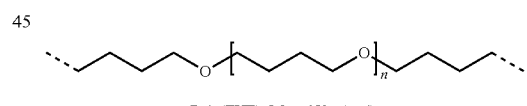

Poly(THF) (Mn ~650 g/mol)

Further preferred examples of compound Y comprise a pair of carboxyl groups or a pair of derivatives of a carboxyl group as first functional group and a pair of carboxyl groups or a pair of derivatives of a carboxyl group as second functional group, whereby each pair of carboxyl groups or each pair of derivatives of a carboxyl group comprises at least two carbon atoms (substituted or non-substituted), preferably two or three carbon atoms, most preferably two carbon atoms between the two carbonyl groups of the pair of carboxyl groups or between the two carbonyl groups of a pair of derivatives of a carboxyl group. The two or three carbon atoms between two carbonyl groups can be substituted or non-substituted. The bond between this two or three carbon atoms can be a saturated bond, an unsaturated bond or can be part of an aromatic or cyclic structure. Some preferred examples of compound Y are given below.

Some preferred examples are given below:

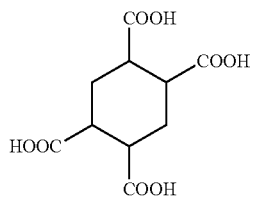

1,2,4,5-Cyclohexanetetracarboxylic Acid

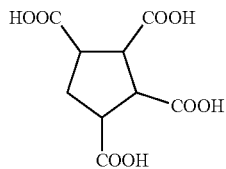

1,2,3,4-Cyclopentanetetracarboxylic Acid

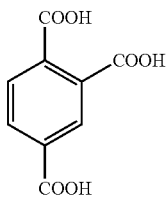

Trimellitic acid

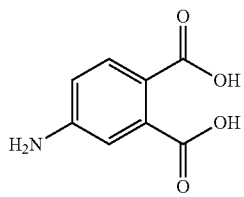

4-Aminophthalic acid

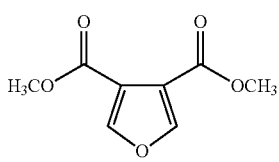

Dimethyl 3,4-furandicarboxylate

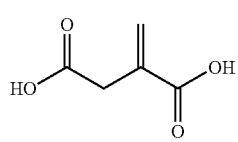

Itaconic acid

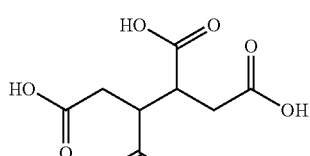

1,2,3,4-Butanetetracarboxylic acid

-continued

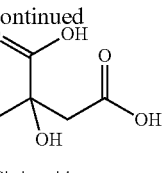

Citric acid

Other preferred examples of compound Y comprise an anhydride group as first functional group and a pair of carboxyl groups or a pair of derivatives of a carboxyl group as second functional group, with two or three carbon atoms (substituted or non-substituted), preferably two carbon atoms, between the carbonyl groups of the anhydride group and with two or three carbon atoms (substituted or non-substituted), preferably two carbon atoms, between the two carbonyl groups of a pair of carboxyl groups or between the two carbonyl groups of a pair of derivatives of a carboxyl group.

In case the compound Y comprises further functional groups, for example at least one third functional group and/or at least one fourth functional group, the further functional groups preferably comprise polymerisable group, for example a group comprising an unsaturated carbon-carbon bond, a carboxyl group, a derivative of a carboxyl group, an anhydride group or a pair of carboxyl groups or derivatives of a carboxyl group.

Alcohol Z

The alcohol Z comprises at least one hydroxyl (—OH) functional group and at least one polymerisable group P2. Polymerisable group P2 may comprise any type of polymerisable group such as an unsaturated bond, a carboxyl group, a derivative of a carboxyl group or an hydroxyl functional group. It is clear that alcohol Z may comprise more than one polymerisable group. The alcohol Z further comprises a nitrogen atom having three substituents, each of the three substituents comprising at least one carbon atom. The alcohol Z furthermore comprises a first carbon atom, a second carbon atom and optionally a third carbon between the nitrogen (having the three substituents) and the at least one hydroxyl functional group of the alcohol Z. The first carbon atom, the second carbon atom and the optional third carbon atom can be independently from each other be substituted or non-substituted.

Preferably, the alcohol Z has two carbon atoms between the nitrogen (having the three substituents) and the at least one hydroxyl functional group of the alcohol Z, the two carbon atoms can be independently substituted or non-substituted. The bond between the two carbon atoms that are positioned between the nitrogen atom and a hydroxyl functional group can be saturated or can be part of an aromatic structure. The alcohol Z can also be referred to as a beta-amino alcohol.

The polymerisable group P2 may comprise any type of groups that can be polymerized and comprises for example an unsaturated bond, a carboxyl group, a derivative of a carboxyl group or an hydroxyl functional group.

Preferred alcohols Z comprise one or more hydroxyl functional groups as polymerisable group. In such case alcohol Z comprises a polyol, for example a diol or a triol.

For the sake of completeness, the terms polyol, amino-alcohol and beta-amino alcohol are explained below:

A polyol is an organic compound comprising multiple hydroxyl groups. Polyols include for example diols (having two hydroxyl groups) and triols (having three hydroxyl groups).

An amino-alcohol refers to compounds having both a hydroxyl (—OH) group and an amino group (—NR$_2$) group.

A beta-amino-alcohol refers to amino-alcohols having a nitrogen atom attached to the beta carbon atom attached to a hydroxyl group;

A beta carbon refers to the second carbon atom that attaches a functional group, in this case the second carbon atom that attaches a hydroxyl group.

Some preferred alcohols comprising a hydroxyl functional group and a polymerizable group P2 are given below:

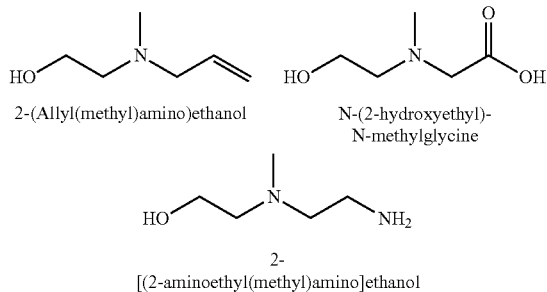

2-(Allyl(methyl)amino)ethanol    N-(2-hydroxyethyl)-N-methylglycine

2-[(2-aminoethyl(methyl)amino]ethanol

Some preferred examples comprising polyols Z are given below:

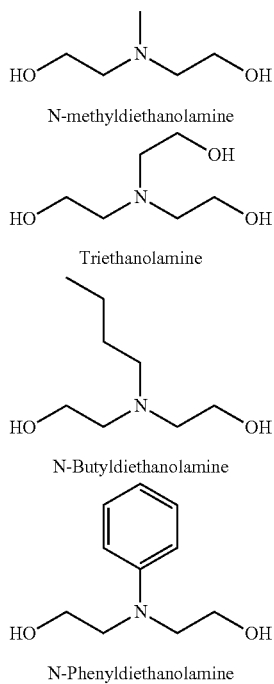

N-methyldiethanolamine

Triethanolamine

N-Butyldiethanolamine

N-Phenyldiethanolamine

In a preferred method a mixture of alcohols comprising the alcohol Z or reacted with alcohol Z is used in step b). Preferably, the total of hydroxyl functional groups of alcohol Z over the total number of hydroxyl functional groups of all alcohols in the mixtures of alcohols (including alcohol Z) is at least 5%, at least 10%, at least 20%, or at least 50%.

A preferred mixture of alcohols comprises the above specified alcohol Z and at least one diol, for example 1,10-decanediol, 1,6-hexanediol, 1,5-pentanediol, 1,4-butanediol, 1,2-ethanediol, cyclohexanediol, bisphenol A, polymeric diols or oligomeric diols. Non-limiting examples of suitable polymeric diols include a hydroxyl terminated polyether (polyether polyols); hydroxyl terminated polyester (polyester polyols); or mixture thereof, with one or more chain extenders, all of which are well known to those skilled in the art.

Another preferred mixture of polyols comprises the above specified alcohol Z and at least one triol or a polyol with more than three hydroxyl functional groups, for example trimethylolpropane (TMP). Other non-limiting examples of suitable polyols with hydroxyl functionality greater than 2 comprise pentaerythritol, xylitol, erythritol, polyphenols, and polymeric polyols. Examples of polymeric polyols are polyvinylalcohol and cellulose.

A particularly preferred mixture comprises an alcohol Z, for example a polyol Z, and at least one other polyol for example a polyol Z and a diol as for example 1,6 hexane diol or a polyol Z and a triol for example trimethylolpropane (TMP).

A further preferred mixture of alcohols comprises an alcohol Z, for example a polyol Z, at least one diol, for example 1, 6 hexanediol and at least one triol, for example trimethylolpropane (TMP).

Compound Y and alcohol Z are preferably present in a particular amount in step c) of the method to prepare a composition according to the present invention. More particularly, compound Y and alcohol Z are contacted in step c) in a molar ratio lower than 2, whereby the molar ratio Z to Y is defined in terms of the total number of hydroxyl functional groups of alcohol Z or the total number of hydroxyl functional groups of all alcohols of the mixture of alcohols (comprising alcohol Z) in case a mixture of alcohols is used divided by the total number of anhydride functional groups and pairs of carboxyl groups or derivatives of carboxyl groups.

More preferably, compound Y and alcohol Z are contacted in step c) in a molar ratio Z to Y ranging between 0.5 and 1.5, more particularly between 0.75 and 1.25 and most preferably between 0.9 and 1.1.

In preferred methods alcohol Z is obtained by contacting an amine V and a compound X. Preferably, amine V comprises at least one reactive N—H bond. Preferably, compound X comprises at least one epoxide group, whereby the two carbon atoms of the at least one epoxide group can be independently from each other substituted or non-substituted or they can be part of a polymeric chain.

Some preferred amines V are given below:

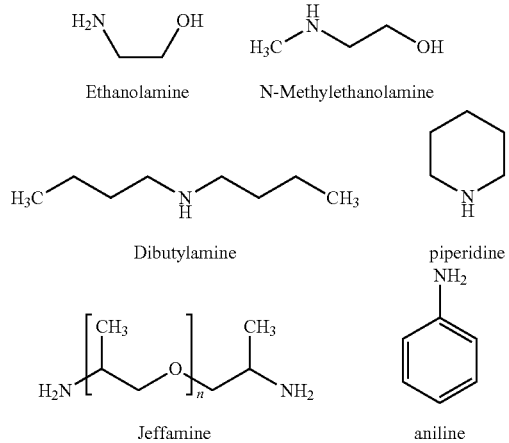

Ethanolamine    N-Methylethanolamine

Dibutylamine    piperidine

Jeffamine    aniline

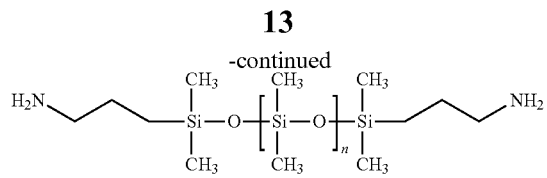

Poly(dimethylsiloxane), bis(3-aminopropyl) terminated

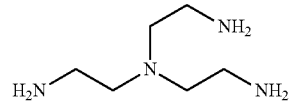

Tris(2-aminoethyl)amine

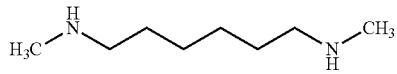

N,N'-Dimethyl-1,6-hexanediamine

Some preferred compounds X comprising at least one epoxide group are given below:

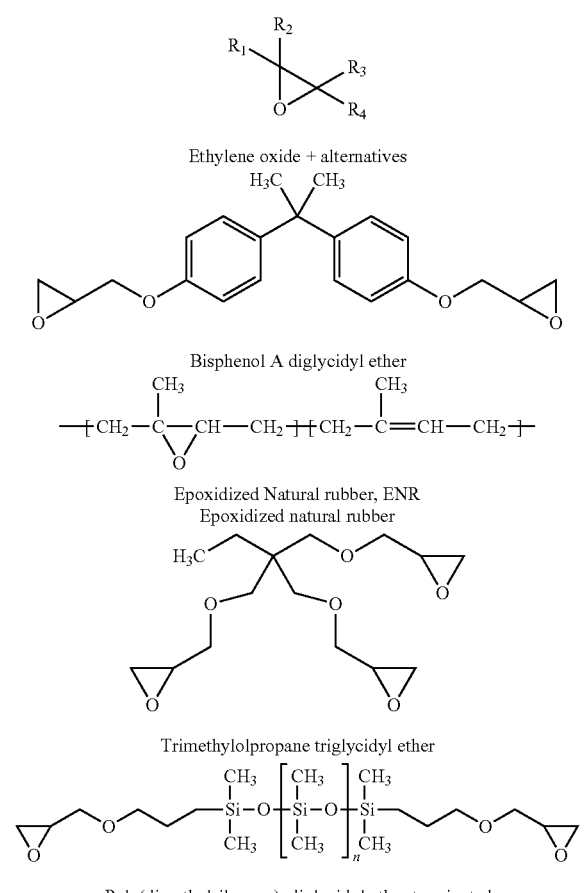

Ethylene oxide + alternatives

Bisphenol A diglycidyl ether

Epoxidized Natural rubber, ENR
Epoxidized natural rubber

Trimethylolpropane triglycidyl ether

Poly(dimethylsiloxane), diglycidyl ether terminated

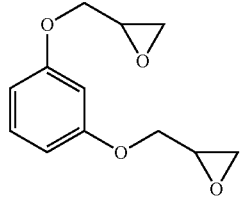

Resorcinol diglycidyl ether

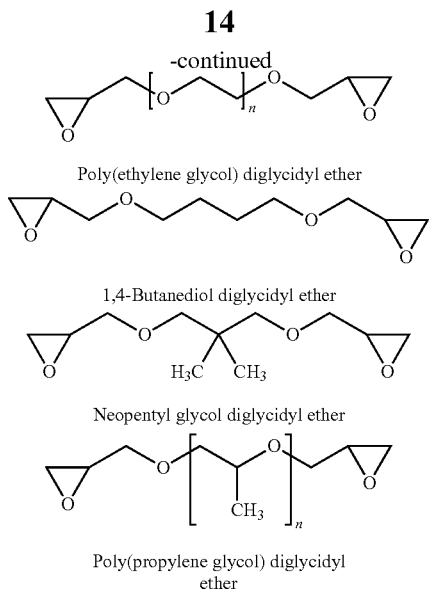

Poly(ethylene glycol) diglycidyl ether 1,4-Butanediol diglycidyl ether

Neopentyl glycol diglycidyl ether

Poly(propylene glycol) diglycidyl ether

To prepare alcohol Z, amine V and compound X are preferably contacted in in a molar ratio of amine V to compound X ranging between 0.5 and 1.5, more preferably in a molar ratio of amine V to compound X ranging between 0.75 and 1.25 and most preferably in a molar ratio of amine V to compound X ranging between 0.9 and 1.1. The molar ratio V to X is hereby defined in terms of the number of reactive N—H bonds of amine V divided by the number of epoxide functional groups of compound X.

According to a second aspect of the present invention a precursor for preparing a polymer is provided. The precursor comprises at least one unit of formula (I) and/or at least one unit of formula (II)

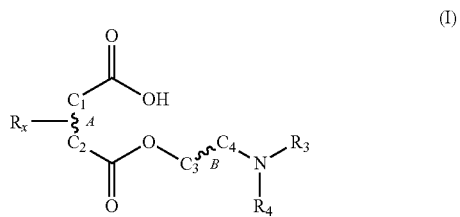

(I)

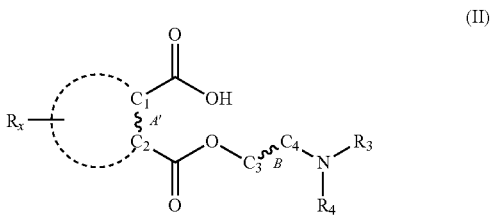

(II)

with
- $C_1$, $C_2$, $C_3$ and $C_4$ being carbon atoms, whereby $C_1$ and $C_2$ being positioned next to a carbonyl group, $C_3$ being positioned next to an oxygen atom of a —CO—O— group and $C_4$ being positioned next to a nitrogen atom;
- A comprising a saturated or unsaturated bond between $C_1$ and $C_2$ or comprising a chain connecting $C_1$ and $C_2$ by means of an additional carbon atom $C_A$ (preferably by one additional carbon atom $C_A$), whereby at least one of $C_1$, $C_2$ or $C_A$ is substituted with a group $R_x$, said group $R_x$ being a polymerisable group or a polymeric group;

A' comprising a bond between $C_1$ and $C_2$ or comprising a chain connecting $C_1$ and $C_2$ by means of one additional carbon atom $C_A$, whereby said bond A' or said chain A' is a part of an aromatic or a cyclic structure, said aromatic or said cyclic structure being substituted with at least one group $R_x$, said group $R_x$ being a polymerisable group or a polymeric group;

B comprising a bond between $C_3$ and $C_4$ or a chain connecting $C_3$ and $C_4$ by means of one additional carbon atom $C_B$ (preferably by one additional carbon atom $C_B$), with each of $C_3$, $C_4$ and $C_B$ being independently from each other non-substituted or substituted with the bond between $C_3$ and $C_4$ being a linear saturated bond or unsaturated bond or with the bond between $C_3$ and $C_4$ or the chain connecting $C_3$ and $C_4$ being part of an aromatic or cyclic structure;

$R_3$ and $R_4$ not being hydrogen; and with the unit of formula (I) or the unit of formula (II) having at least one open attachment site allowing to form a prepolymer or polymer.

Preferably, at least one of the substituents of carbon atoms $C_1$, $C_2$ or $C_A$, or in case $C_1$, $C_2$ and/or $C_A$ belong to an aromatic or cyclic structure at least one of the substituents of this aromatic or cyclic structure, or at least one of the substituents of $C_3$, $C_4$ or $C_B$ or in case $C_3$, $C_4$ and/or $C_B$ belong to an aromatic or cyclic structure at least one of the substituents of this aromatic or cyclic structure or at least $R_x$ or at least one of the substituents $R_3$ or $R_4$ of the nitrogen atom has an open attachment site to form a prepolymer or polymer. Possibly, more than one of these substituents has an open attachment site to form a prepolymer or polymer.

As mentioned above $R_3$ and $R_4$ are not hydrogen. Preferably, $R_3$ and $R_4$ are independently from each other selected from the group consisting of substituents comprising at least one carbon atom.

As mentioned above, for the purpose of this invention, a polymerisable group may comprise any type of group that can be polymerized and comprises for example an unsaturated carbon-carbon bond (double or triple bond), a carboxyl group, a derivative of a carboxyl group or a hydroxyl functional group. For the purpose of this invention the terms 'polymerisable group' and 'group able to polymerise' are interchangeable.

For the purpose of this invention, with 'polymeric group' is meant a structure comprising multiple repetition of units derived from molecules of low relative molecular mass.

Examples of polymeric groups comprise polyesters, polyacrylates, polyurethanes, polyethylene oxide, polymethacrylate, polystyrene, copolymer of acrylate, poly(methyl methacrylate), methacrylate and/or styrene, poly(isobornyl acrylate), polyacrylonitrile, polyether; polylactic acid, polyamide, polyester amide, polycarbonate, poly-alpha-olefin, ethylene propylene diene monomer (M-class) rubber (EPDM), ethylene propylene rubber (EPM), hydrogenated or unhydrogenated polybutadienes, acrylonitrile butadiene styrene (ABS), styrene-butadiene rubber (SBR), polysiloxanes; and/or block, comb and/or star copolymers of such polymeric groups.

B preferably comprises a saturated or unsaturated bond between the first carbon atom $C_3$ and the second carbon atom $C_4$ or comprises a linear chain connecting the first carbon atom $C_3$ and the second carbon atom $C_4$ by means of an additional carbon atom $C_B$, whereby the bond between the first carbon atom $C_3$ and the additional carbon atom $C_B$ and the bond between the additional carbon atom $C_B$ and the second carbon atom $C_4$ may comprise a saturated or an unsaturated bond.

The substituents of the carbon atoms $C_1$, $C_2$ and $C_A$ are preferably independently from each other selected from the group consisting of hydrogen, a halogen, a hydroxyl functional group and substituents comprising at least one carbon atom. Preferably, at least one of these substituents comprises a substituent comprising at least one carbon atom. Possibly, all of these substituents comprise a substituent comprising at least one carbon atom.

In case $C_1$ and $C_2$ or $C_1$, $C_2$ and $C_A$ belong to an aromatic or cyclic structure, the substituents of this aromatic or cyclic structure are preferably independently from each other selected from the group consisting of hydrogen, a halogen, a hydroxyl functional group and substituents comprising at least one carbon atom. Preferably, at least one of these substituents comprises a substituent comprising at least one carbon atom. Possibly, all of these substituents comprise a substituent comprising at least one carbon atom.

The substituents of the carbon atoms $C_3$, $C_4$ and $C_B$ are preferably independently from each other selected from the group consisting of hydrogen, a halogen, a hydroxyl functional group and substituents comprising at least one carbon atom. Preferably, at least one of these substituents comprises a substituent comprising at least one carbon atom. Possibly, all of these substituents comprise a substituent comprising at least one carbon atom.

In case $C_3$ and $C_4$ or $C_3$, $C_4$ and $C_B$ belong to an aromatic or cyclic structure, the substituents of this aromatic or cyclic structure are preferably independently from each other selected from the group consisting of hydrogen, a halogen, a hydroxyl functional group and substituents comprising at least one carbon atom. Preferably, at least one of these substituents comprises a substituent comprising at least one carbon atom. Possibly, all of these substituents comprise a substituent comprising at least one carbon atom.

A halogen is generic and includes fluorine, chlorine, bromine and iodine.

Substituents comprising at least one carbon atom comprise for example alkyl (for example $C_{1-20}$ alkyl), alkenyl (for example $C_{2-20}$ alkenyl), alkynyl (for example $C_{2-20}$ alkynyl), aryl (for example $C_{6-12}$ aryl), cycloalkyl (for example $C_{3-8}$ cycloalkyl), arylalkyl (for example $C_{6-12}$ aryl$C_{1-20}$ alkyl), cycloalkylalkyl (for example $C_{3-8}$ cycloalkyl$C_{1-20}$ alkyl), heteroalkyl (for example hetero$C_{1-20}$ alkyl), heterocyclyl, heterocyclylalkyl (for example heterocyclylC1-20alkyl), heteroaryl, and heteroarylalkyl (for example heteroaryl$C_{1-20}$ alkyl);

wherein said alkyl, alkenyl, alkynyl, cycloalkylalkyl, arylalkyl, heterocyclylalkyl; and heteroarylalkyl, optionally comprises one or more heteroatoms in the alkyl, alkenyl, alkynyl moiety, said heteroatoms being each independently selected from O, S and N;

wherein at least one carbon atom or heteroatom of said alkyl, alkenyl, alkynyl, aryl, cycloalkyl, arylalkyl, heteroalkyl, heterocyclyl, heteroaryl, cycloalkylalkyl, heterocyclylalkyl; and heteroarylalkyl; can be oxidized to form at least one C=O, C=S, N=O, N=S, S=O or S(O)2;

wherein said alkyl, alkenyl, alkynyl, aryl, cycloalkyl, arylalkyl, heteroalkyl; heterocyclyl; heteroaryl; cycloalkylalkyl; heterocyclylalkyl; and heteroarylalkyl; can be unsubstituted or substituted with one or more $W^1$; each $W^1$ is independently selected from the group consisting of halogen or a substituent comprising at least one carbon atom and optionally further comprising one or more heteroatoms selected from O, S and N.

Preferably, a unit of formula (I) or a unit of formula (II) comprises in addition to the polymerisable or polymeric group $R_x$ one or more polymerisable or polymeric groups $R_y$. Preferably, at least one of the substituents of the carbon atoms of chain B in case chain B comprises a linear chain, or at least one of the substituents of the aromatic or cyclic structure to which chain B belongs in case chain B is part of a cyclic or aromatic structure or at least one of the substituents $R_3$, $R_4$ of the nitrogen atom comprises a polymerisable or polymeric group $R_y$.

In particular embodiments more than one carbon atom of the carbon atoms $C_1$, $C_2$ or $C_A$ is substituted with a polymerisable or polymeric group, for example with a polymerisable or polymeric group $R_x$ and with one or more polymerisable of polymeric groups $R_y$. The carbon atoms $C_1$ and $C_2$ of a unit of formula (I) of formula (II) are for example substituted with a polymerisable or polymeric group. In case the unit of formula (I) or formula (II) comprises a third carbon atom (carbon atom $C_A$), this third carbon atom (carbon atom $C_A$) can also be substituted with a polymerisable or polymeric group. In case one or more of the carbon atoms $C_1$, $C_2$ or $C_A$ belong to an aromatic or cyclic structure also the aromatic or cyclic structure may be substituted with one or more polymerisable or polymeric groups $R_y$.

In other embodiments more than one carbon atom of the carbon atoms $C_3$, $C_4$ or $C_B$ is substituted with a polymerisable or polymeric group. The carbon atoms $C_3$ and $C_4$ of a unit of formula (I) are for example substituted with a polymerisable or polymeric group. In case the unit of formula (I) or formula (II) comprises a third carbon atom (carbon atom $C_B$), this third carbon atom (carbon atom $C_B$) can also be substituted with a polymerisable or polymeric group. In case one or more of the carbon atoms $C_3$, $C_4$ or $C_B$ belong to an aromatic or cyclic structure also the aromatic or cyclic structure may be substituted with one or more polymerisable or polymeric groups.

Also the substituents $R_3$, $R_4$ of the nitrogen atom may comprise a polymerisable or polymeric group $R_y$.

The unit of formula (I) or the unit of formula (II) of a precursor according to the present invention comprises a tertiary amine and a pendant carboxyl group. The relative position of the carboxyl group and the nitrogen atom of the tertiary amine is determined by the number of carbon atoms between the first and second carbonyl group as indicated by A (for a unit of formula (I)) of by A' (for a unit of formula (II)) and/or by the number of carbon atoms between the nitrogen atom and of the oxygen atom as indicated by B.

The number of carbon atoms between the first and the second carbonyl group is preferably two ($C_1$ and $C_2$) or three ($C_1$, $C_2$ and $C_A$), with each of the carbon atoms being independently of each other substituted or non-substituted. Most preferably, the number of carbon atoms between the first and the second carbonyl group is two ($C_1$ and $C_2$).

The number of carbon atoms between the nitrogen atom and of the oxygen atom is preferably two ($C_3$ and $C_4$) or three ($C_3$, $C_4$ and $C_B$), with each of the carbon atoms being independently of each other substituted or non-substituted. Most preferably, the number of carbon atoms between the nitrogen atom and the oxygen atom is two ($C_3$ and $C_4$).

In preferred embodiments the number of carbon atoms between the first and the second carbonyl group is two ($C_1$ and $C_2$) and the number of carbon atoms between the nitrogen atom and the oxygen atom is two ($C_3$ and $C_4$).

For a unit of formula (I) with A being a bond between a first carbon $C_1$ and a second carbon atom $C_2$, A may for example comprise one of the following examples:

A being a saturated bond between a first carbon atom $C_1$ and a second carbon atom $C_2$, with at least one of the substituents of the first carbon atom $C_1$ or the second carbon $C_2$ being a polymerisable group as illustrated by the structure below:

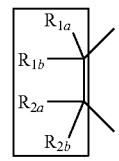

with at least one of $R_{1a}$, $R_{1b}$, $R_{2a}$ or $R_{2b}$ being a polymerisable group.

It is clear that more than one of the substituents $R_{1a}$, $R_{1b}$, $R_2$ and $R_{2b}$ may comprise a polymerisable group.

A being an unsaturated bond between a first carbon atom $C_1$ and a second carbon atom $C_2$, with at least one of the substituents of the first carbon atom $C_1$ or the second carbon atom $C_2$ being a polymerisable group as illustrated by the structure below:

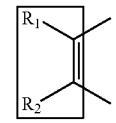

with at least one of $R_1$ or $R_2$ being a polymerisable group.

It is clear that both substituents $R_1$ and $R_2$ may comprise a polymerisable group.

For a unit of formula (I) with A being a chain connecting a first carbon atom $C_1$ and a second carbon atom $C_2$ by means of an additional carbon atom $C_A$, chain A may for example comprise one of the following examples:

A connects a first carbon atom $C_1$ and a second carbon atom $C_2$ by means of a third carbon atom $C_A$ (positioned between the first carbon atom $C_1$ and the second carbon atom $C_2$), with an unsaturated bond between the first carbon atom $C_1$ and the third carbon atom $C_A$ and between the third carbon atom $C_1$ and the second carbon atom $C_2$, with at least one of the substituents of the first carbon atom $C_1$, the second carbon atom $C_1$ or the third carbon atom $C_1$ being a polymerisable group as illustrated by the structure below:

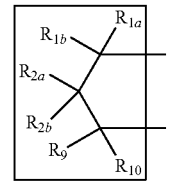

with at least one of $R_{1a}$, $R_{1b}$, $R_{2a}$, $R_9$ or $R_{10}$ being a polymerisable group.

It is clear that more than one of the substituents $R_{1a}$, $R_{1b}$, $R_2$, $R_{2b}$, $R_9$ or $R_{10}$ may comprise a polymerisable group.

A connects a first carbon atom $C_1$ and a second carbon atom $C_2$ by means of a third carbon atom $C_A$ (positioned between the first carbon atom $C_1$ and the second carbon atom $C_2$), with an unsaturated bond between the first carbon atom $C_1$ and the third carbon atom $C_A$ or between the second carbon atom $C_2$ and the third carbon atom $C_A$, with at least one of the substituents of the first carbon atom $C_1$, the second carbon atom $C_2$ or the third carbon atom $C_A$ comprising a polymerisable group. Some examples of such chain A are given below

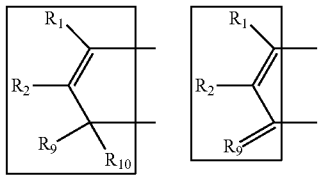

with at least one of $R_1$, $R_2$, $R_9$ or $R_{10}$ being a polymerisable group.

It is clear that more than one of the substituents $R_{1a}$, $R_{1b}$, $R_2$, $R_{2b}$, $R_9$ or $R_{10}$ may comprise a polymerisable group.

For a unit of formula (II) with A' being a bond between a first carbon atom $C_1$ and a second carbon atom $C_2$ that is a part of an aromatic structure or cyclic structure, A' may for example comprise the following example:

A' is a bond between a first carbon atom $C_1$ and a second carbon atom $C_2$ and is part of an aromatic structure with the aromatic structure having at least one substituent comprising a polymerisable group as illustrated below

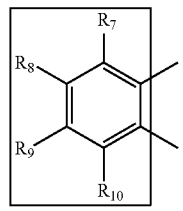

with $R_7$, $R_8$, $R_9$ and $R_{10}$ being hydrogen, a halogen, a hydroxyl functional group or a substituent comprising at least one carbon atom and with at least one of $R_7$, $R_8$, $R_9$, $R_{10}$ comprising a polymerisable group.

It is clear that more than one of the substituents $R_7$, $R_8$, $R_9$ or $R_{10}$, $R_{11}$ may comprise a polymerisable group.

For a unit of formula (II) with A' being a chain connecting a first carbon atom $C_1$ and a second carbon atom $C_2$ by means of a third carbon atom $C_A$ (positioned between the first carbon atom $C_1$ and the second carbon atom $C_2$), with the chain A' being part of a cyclic structure, chain A' may for example comprise the following example:

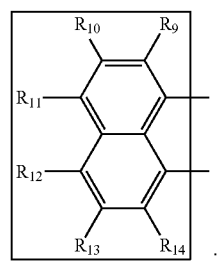

with $R_9$, $R_{10}$, $R_{11}$, $R_{12}$, $R_{13}$ and $R_{14}$ being hydrogen, a halogen, a hydroxyl functional group or a substituent comprising at least one carbon atom and with at least one of being a polymerisable group.

It is clear that more than one of the substituents $R_9$, $R_{10}$, $R_{11}$, $R_{12}$, $R_{13}$ or $R_{14}$ may comprise a polymerisable group.

In case B is a bond between two carbon atoms (between $C_3$ and $C_4$), B may for example comprise one of the following examples:

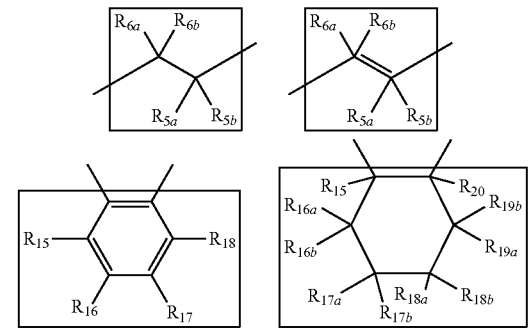

With $R_5$, $R_{5a}$, $R_{5b}$, $R_6$, $R_{6a}$, $R_7$, $R_{15}$, $R_{16}$, $R_{16a}$, $R_{16b}$, $R_{17}$, $R_{17a}$, $R_{17b}$, $R_{18}$, $R_{18a}$, $R_{18b}$, $R_{19a}$, $R_{19b}$, $R_{20}$ being hydrogen, a halogen, a hydroxyl functional group or a substituent comprising at least one carbon atom. One or more of $R_5$, $R_{5a}$, $R_{5b}$, $R_6$, $R_{6a}$, $R_7$, $R_{15}$, $R_{16}$, $R_{16a}$, $R_{16b}$, $R_{17}$, $R_{17a}$, $R_{17b}$, $R_{18}$, $R_{18a}$, $R_{18b}$, $R_{19a}$, $R_{19b}$ and $R_{20}$ may comprise a polymerisable or polymeric group.

In case B comprises a chain connecting carbon atom $C_3$ and carbon atom $C_4$ by means of carbon atom $C_B$ (positioned between $C_3$ and $C_4$), B may for example comprise one of the following examples:

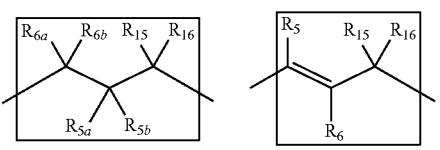

with $R_9$, $R_{5a}$, $R_{5b}$, $R_9$, $R_{5a}$, $R_7$, $R_{15}$, $R_{16}$, $R_{16a}$ and $R_{16b}$ being hydrogen, a halogen, a hydroxyl functional group or a substituent comprising at least one carbon atom. One or more of $R_9$, $R_{5a}$, $R_{5b}$, $R_6$, $R_{6a}$, $R_7$, $R_{15}$, $R_{16}$, $R_{16a}$ and $R_{16b}$ may comprise a polymerisable or polymeric group.

Some preferred examples of units of formula (I) and formula (II) are given below:

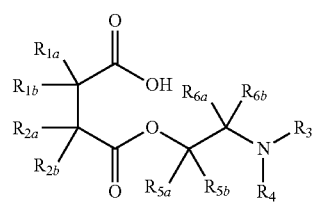

21

-continued

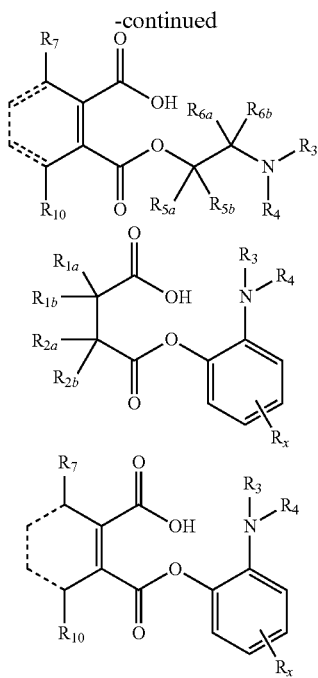

with $R_1$, $R_2$, $R_{1a}$, $R_{1b}$, $R_{2a}$, $R_{2b}$, $R_9$, $R_{5a}$, $R_{5b}$, $R_9$, $R_{5a}$, $R_7$, $R_{10}$ being hydrogen, a halogen, a hydroxyl functional group or a substituent comprising at least one carbon atom, and with $R_3$, $R_4$ being a substituent comprising at least one carbon atom.

One or more of $R_1$, $R_2$, $R_{1a}$, $R_{1b}$, $R_{2a}$, $R_{2b}$, $R_5$, $R_{5a}$, $R_{5b}$, $R_9$, $R_{5a}$, $R_7$, $R_{10}$, $R_3$, $R_4$ may comprise a polymerisable or polymeric group.

It is clear that A, A' and B are not limited to the above given examples. Furthermore it is clear that a unit of formula (I) or a unit of formula (II) may comprise other combinations of A and B or other combinations of A' and B than the given examples.

The precursor according to the present invention preferably comprises a plurality of units of formula (I), a plurality of units of formula (II) or a combination of a plurality of units of formula (I) and a plurality of units of formula (II).

In case the precursor comprises a plurality of units of formula (I), the units can be the same or can be different. Similarly, in case the precursor comprises a plurality of units of formula (II), the units can be same or can be different.

The precursor according to the present invention allows to form prepolymer or polymer comprising a network. More preferably, the precursor according to the present invention allows to form a prepolymer or polymer comprising a covalent adaptable network (CAN). For the purpose of this invention a covalent adaptable network is defined as a network comprising exchangeable chemical bonds.

The precursor according to the present invention or a composition comprising such precursor is suitable to be used in any processing techniques known in the art, for example suitable to be used in extrusion, injection moulding, compression moulding, transfer moulding, foam moulding, thermoforming, rotation moulding and 3D printing.

A further advantage of a precursor according to the present invention or a composition comprising such a precursor is its recyclability.

According to a third aspect of the present invention, a method to prepare a polymer starting from a precursor as specified above is provided.

22

According to a fourth aspect of the present invention a polymer comprising at least one unit of formula (I) or at least one unit of formula (II),

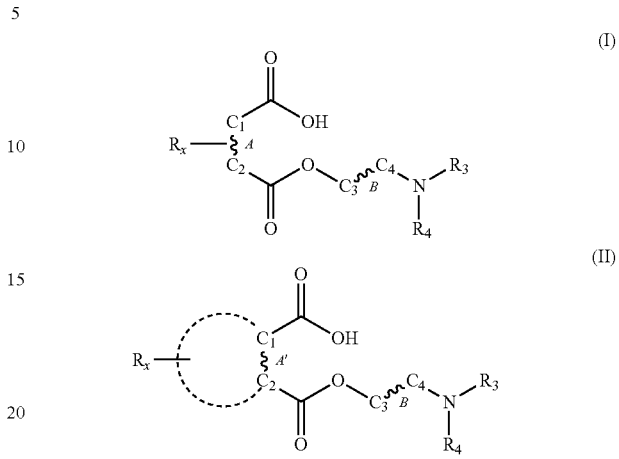

with
$C_1$, $C_2$, $C_3$ and $C_4$ being carbon atoms, whereby $C_1$ and $C_2$ being positioned next to a carbonyl group, $C_3$ being positioned next to an oxygen atom and $C_4$ being positioned next to a nitrogen atom;

A comprising a saturated or unsaturated bond between $C_1$ and $C_2$ or comprising a chain connecting $C_1$ and $C_2$ by means of one additional carbon atom $C_A$ (preferably by one additional carbon atom $C_A$), whereby at least one of $C_1$, $C_2$ or $C_A$ is substituted with a group $R_x$, said group $R_x$ being a polymerisable group or a polymeric group;

A' comprising a bond between $C_1$ and $C_2$ or comprising a chain connecting $C_1$ and $C_2$ by means of one additional carbon atom $C_A$ (preferably by one additional carbon atom $C_A$), whereby said bond A' or said chain A' is a part of an aromatic or a cyclic structure, said aromatic or said cyclic structure being substituted with at least one group $R_x$, said group $R_x$ being a polymerisable group or a polymeric group;

B comprising a bond between $C_3$ and $C_4$ or a chain connecting $C_3$ and $C_4$ by means of one additional carbon atom $C_B$ (preferably by one additional carbon atom $C_B$), with each of $C_3$, $C_4$ and $C_B$ being independently from each other non-substituted or substituted and with the bond between $C_3$ and $C_4$ being a linear saturated bond or unsaturated bond or with the bond between $C_3$ and $C_4$ or the chain connecting $C_3$ and $C_4$ being part of an aromatic or cyclic structure;

$R_3$ and $R_4$ not being hydrogen; and with the unit of formula (I) or the unit of formula (II) having at least one open attachment site allowing to form a prepolymer or polymer.

Preferably, at least one of the substituents of carbon atoms $C_1$, $C_2$ or $C_A$, or in case $C_1$, $C_2$ and/or $C_A$ belong to an aromatic or cyclic structure at least one of the substituents of this aromatic or cyclic structure, or at least one of the substituents of $C_3$, $C_4$ or $C_B$ or in case $C_3$, $C_4$ and/or $C_B$ belong to an aromatic or cyclic structure at least one of the substituents of this aromatic or cyclic structure or at least one of the substituents $R_3$ or $R_4$ of the nitrogen atom has an open attachment site to form a prepolymer or polymer. Possibly, more than one of these substituents have an open attachment site to form a prepolymer or polymer.

As mentioned above R$_3$ and R$_4$ are not hydrogen. Preferably, R$_3$ and R$_4$ are independently from each other selected from the group consisting of substituents comprising at least one carbon atom.

According to a fifth aspect of the present invention, the use of a precursor or a polymer as described above in processing techniques such as extrusion, injection moulding, compression moulding, transfer moulding, foam moulding, thermoforming, rotation moulding or 3D printing is provided. The precursor or the polymer can for example be added to a polymer composition, for example a polymer composition known in the art to be used in such processing techniques.

BRIEF DESCRIPTION OF THE DRAWINGS

The present invention will be discussed in more detail below, with reference to the attached drawings, in which:

FIG. 3(a) shows the tensile strength (top) and the maximum strain (bottom) as a function of the increased amount of added beta-amino diol and FIG. 3(b) shows the stress (MPa) as a function of the strain (%);

DESCRIPTION OF EMBODIMENTS

Figure 1A:
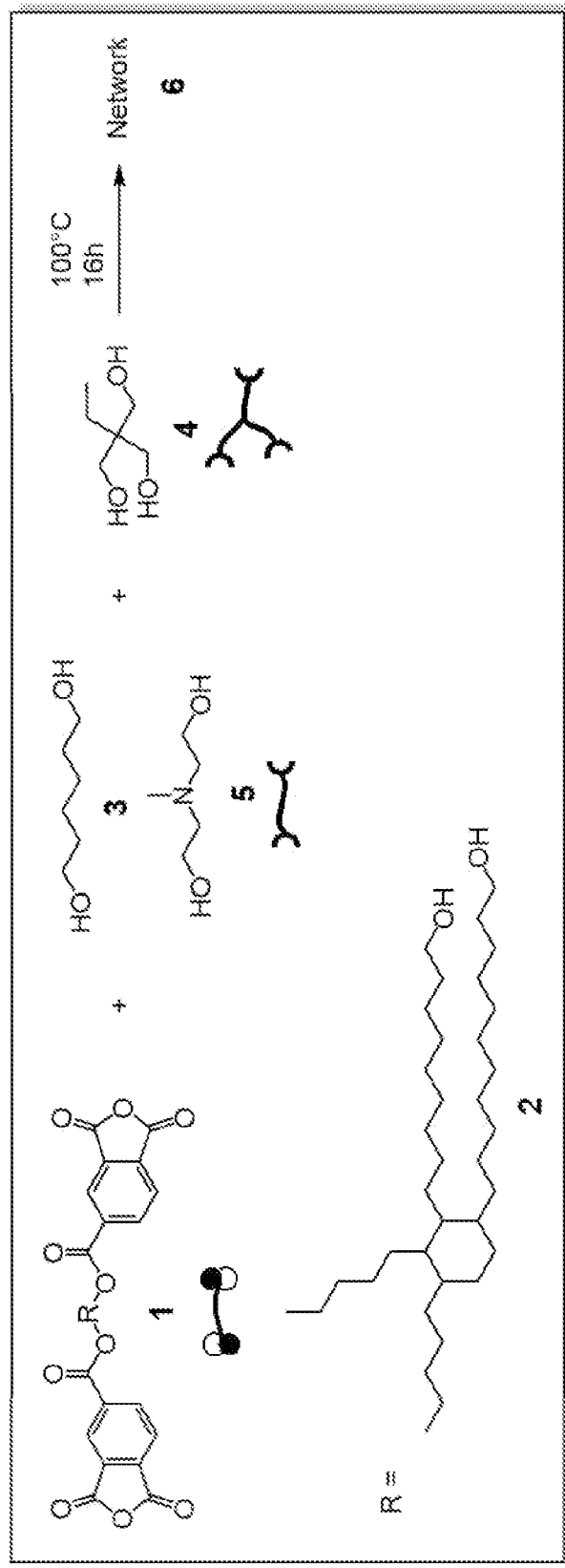
FIG. 1a and FIG. 1b shows a strategy for the synthesis of a polymer according to the present invention.

The present invention will be described with respect to particular embodiments and with reference to certain drawings but the invention is not limited thereto but only by the claims. The drawings are only schematic and are non-limiting. The size of some of the elements in the drawing may be exaggerated and not drawn on scale for illustrative purposes. The dimensions and the relative dimensions do not correspond to actual reductions to practice of the invention.

When referring to the endpoints of a range, the endpoints values of the range are included.

When describing the invention, the terms used are construed in accordance with the following definitions, unless indicated otherwise.

The term and/or when listing two or more items, means that any one of the listed items can by employed by itself or that any combination of two or more of the listed items can be employed.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

EXAMPLES

Example 1 a. Material Synthesis

Figure 1B:
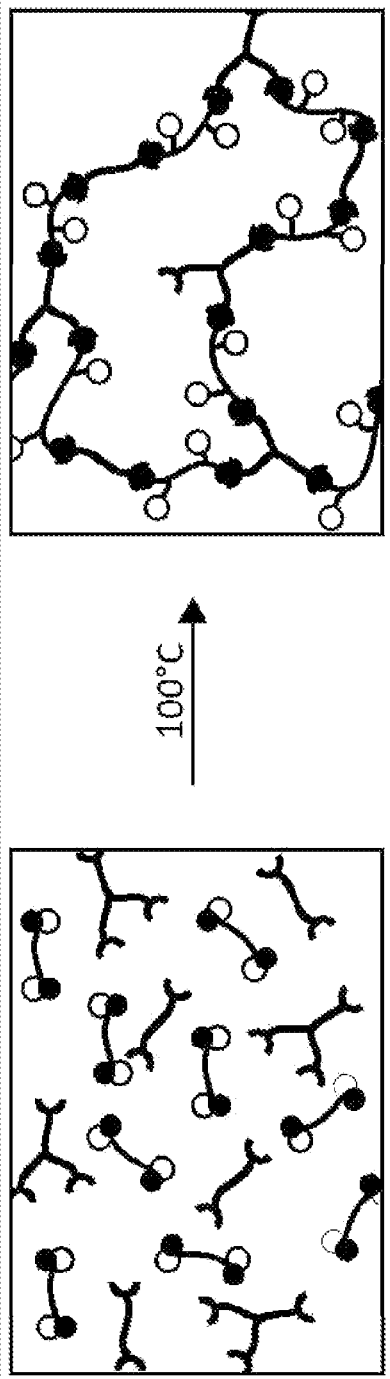

FIG. 1(a) shows the synthesis of a network 6 according to the present invention by adding a diol 3 or a combination of diols 3, 5, and a triol 4 to a dianhydride monomer 1. FIG. 1(b) shows the formation of a network of a composition according to the present invention schematically.

The diol comprises for example 1,6-hexanediol (HD, 3). In case a combination of diols is used examples comprises 1,6-hexanediol (HD, 3) and N-methyl diethanolamine (MDEA, 5). The triol comprises for example trimethylolpropane (TMP, 4). The dianhydride used in the example was synthesized from Pripol 2033 (reference 2 in FIG. 1).

First, a benchmark network was synthesized with 1,6 hexanediol (HD,3) and trimethylolpropane (4) in the polyol mixture. Next, a library of tertiary amine containing materials was synthesized by a drop-in approach by gradually replacing hexanediol (3) with N-methyl diethanolamine (MDEA, 5). The corresponding networks were named N-x, where x denotes the percentage of amino-alcohol in the diol mixture. The amounts of diols, triols and dianhydride is specified in Table 1.

More Details about the Synthesis Method are Given Below:

An amount trimethylolpropane (TMP) is put in a plastic cup (SpeedMixer®) together with a mixture of 1-6-hexanediole (HD) and N-methyl diethanolamine (M DEA). The cup is subsequently heated in an oven at 80° C. for 5 min to melt the alcohol mixture. Pripol-dianhydride was added and the monomers were mixed using a SpeedMixer® (3500 rpm, 60 s). The heating and mixing step was repeated once to obtain a homogeneous mixture. The cup was put in an oven at 100° C. for 2 h, followed by a curing under vacuum at 100° C. for 16 h to remove last traces of toluene (from dianhydride) and suppress amine oxidation. The obtained (foamed) network was cut in small pieces and pressed in a hot press for 20 min (or 60 min for N-0) at 150° C. (2t) to obtain a homogeneous and transparent network.

TABLE 1

| Network | Pripol dianhydride (mmol) | HD (mmol) | MDEA (mmol) | TMP (mmol) |
|---|---|---|---|---|
| N-0 | 6.20 | 2.48 | — | 2.48 |
| N-20 | 6.20 | 1.98 | 0.50 | 2.48 |
| N-40 | 6.20 | 1.49 | 0.99 | 2.48 |
| N-60 | 6.20 | 0.99 | 1.49 | 2.48 |
| N-80 | 6.20 | 0.50 | 1.98 | 2.48 |
| N-100 | 6.20 | — | 2.48 | 2.48 | b. Material Properties

To evaluate the materials the glass transition temperature, tensile strength and the dynamic properties such as stress-relaxation of the different compositions (N-0 to N-100) were determined.

Glass Transition

Figure 2:
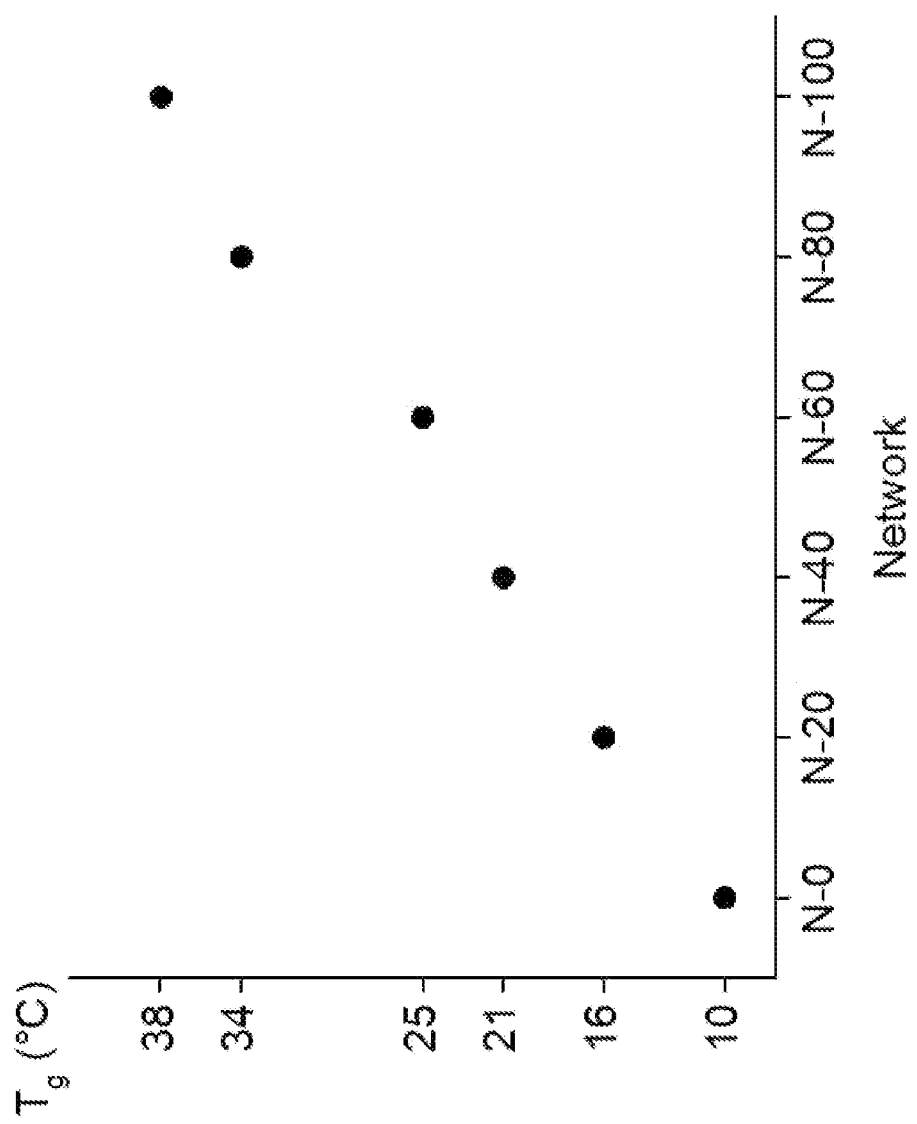
FIG. 2 shows the glass transition temperature of different networks having an increased amount of added beta-amino diol (N-0 to N-100) synthesised according to the strategy shown in FIG. 1.

Differential scanning calorimetry (DSC) was used to measure the glass transition temperatures of the networks. DSC analyses were performed with a Mettler-Toledo 1/700 under nitrogen atmosphere. The samples were analyzed in aluminium sample pans which contained 5-15 mg of the sample. Glass transition temperatures ($T_g$'s) were determined in the second heating step using the STARe software of Mettler-Toledo. Measurements were performed in a temperature range of –50-100° C. with a rate of 10 Kmin$^{-1}$. The glass transition temperatures of the different networks having an increased amount of added beta-amino diol (N–0 to N–100) are shown in FIG. 2.

The benchmark material N–0 had a rather low glass transition temperature of 10° C., resulting from the flexible Pripol-dianhydride. Interestingly, by replacing hexanediol (partially) with MDEA, the $T_g$ linearly increased as a function of amine percentage, reaching up to 38° C. for N–100. This trend can be rationalized by the decrease in free volume that is caused by the additional ionic interactions.

Tensile Strength

Stress-strain experiments were performed with a Tinius-Olsen H10KT tensile tester using a strain rate of 10 mm/min, with a pre-load stress of 0,005 Pa. Flat dog bone-type specimen with an effective gage length of 12 mm, a width of 2 mm and a thickness varying between 1.5 and 2 mm were used. The samples were cut using a Ray-Ran dog bone cutter.

Figure 3:
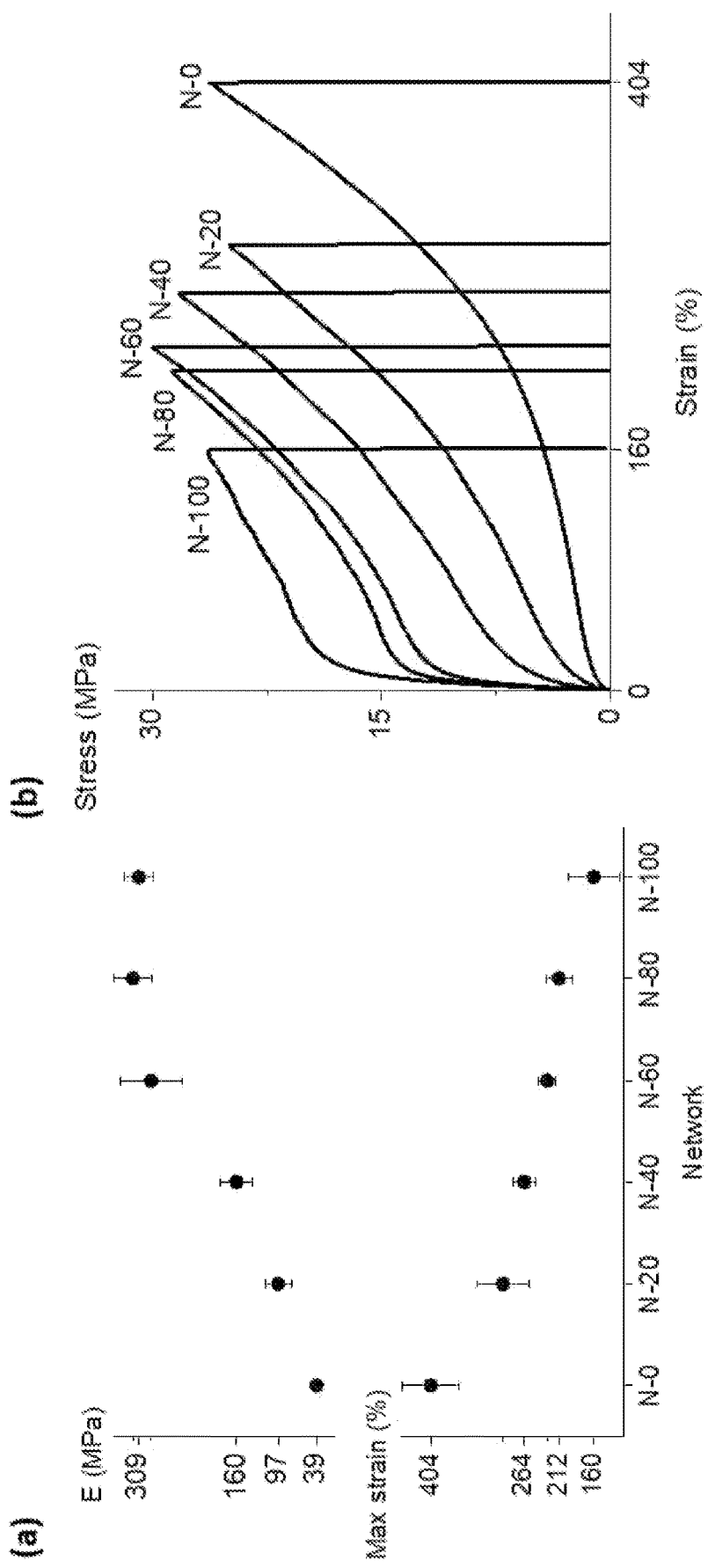
FIG. 3 shows the tensile properties of the different networks having an increased amount of added beta-amino diol.

The results are shown in FIG. 3. FIG. 3(a) (top) shows the Young's- or E-modulus as a function of the increasing amount of beta-amino diol. FIG. 3(a) (bottom) shows the maximum strain (%) as a function of the increasing amount of beta-amino diol. FIG. 3(b) shows the stress (MPa) as a function of the strain (%)

From FIG. 3(a) (top) can be concluded that the Young's- or E-modulus, a measure of the stiffness, is drastically increasing from N–0 up to N–60 by almost a factor of ten (39 and 290 MPa respectively). However, this increase tended to level off at higher amine concentration. Linked to the E-modulus, the maximal strain of the networks showed a decreasing trend, making them more brittle (FIG. 3(a) (bottom)). Interestingly, the stress at break remained more or less constant for all the materials (FIG. 3(b)). Although applicant does not want to be bound by any theory, the observed trend can be assigned to the increased cross-link density caused by the ionic bonds.

Dynamic Properties

Stress-Relaxation

The dynamic behaviour of the networks was quantified with stress relaxation measurements using rheology.

The rheology experiments were conducted on an Anton-Paar MCR 302 rheometer in shear geometry with a plate diameter of 8 mm. A compression force between 0.1 N and 5N and a deformation within the linear viscoelastic region were applied. The samples had a thickness of around 2 mm and were cut with a hollow puncher of Boehm with a diameter of 8 mm. In particular, stress-relaxation, frequency sweep and creep experiments were carried out by this instrumentation.

Figure 4:
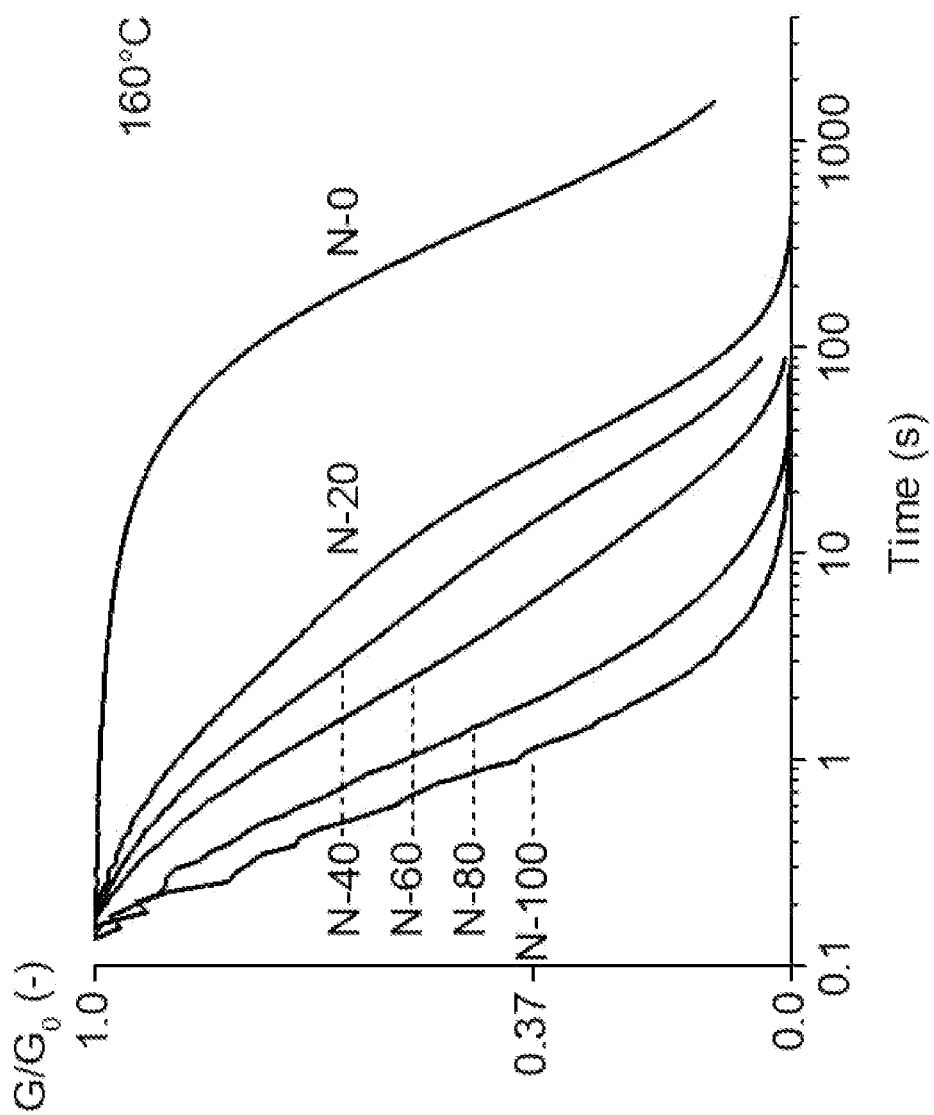
FIG. 4 shows the stress-relaxation curves of the different networks having an increased amount of added beta diol (N-0 to N-100) at 160° C.

The relaxation curves of the different networks at 160° C. are depicted in FIG. 4. The acceleration effect of the neighbouring tertiary amine was clearly observed as well on material level. Indeed, going from the benchmark network (N–0) to N–20 caused an immense drop in relaxation time (515 seconds vs 28 seconds respectively). Faster exchange could be obtained by further increasing the amine-content. Although this further acceleration was less pronounced compared to the first jump (from 0 to 20%), a relaxation time of ~1.1 seconds was finally obtained for N–100. This means that the complete replacement of hexanediol with N-methyl diethanolamine caused an increase in exchange kinetics with a factor of 500.

Figure 5:
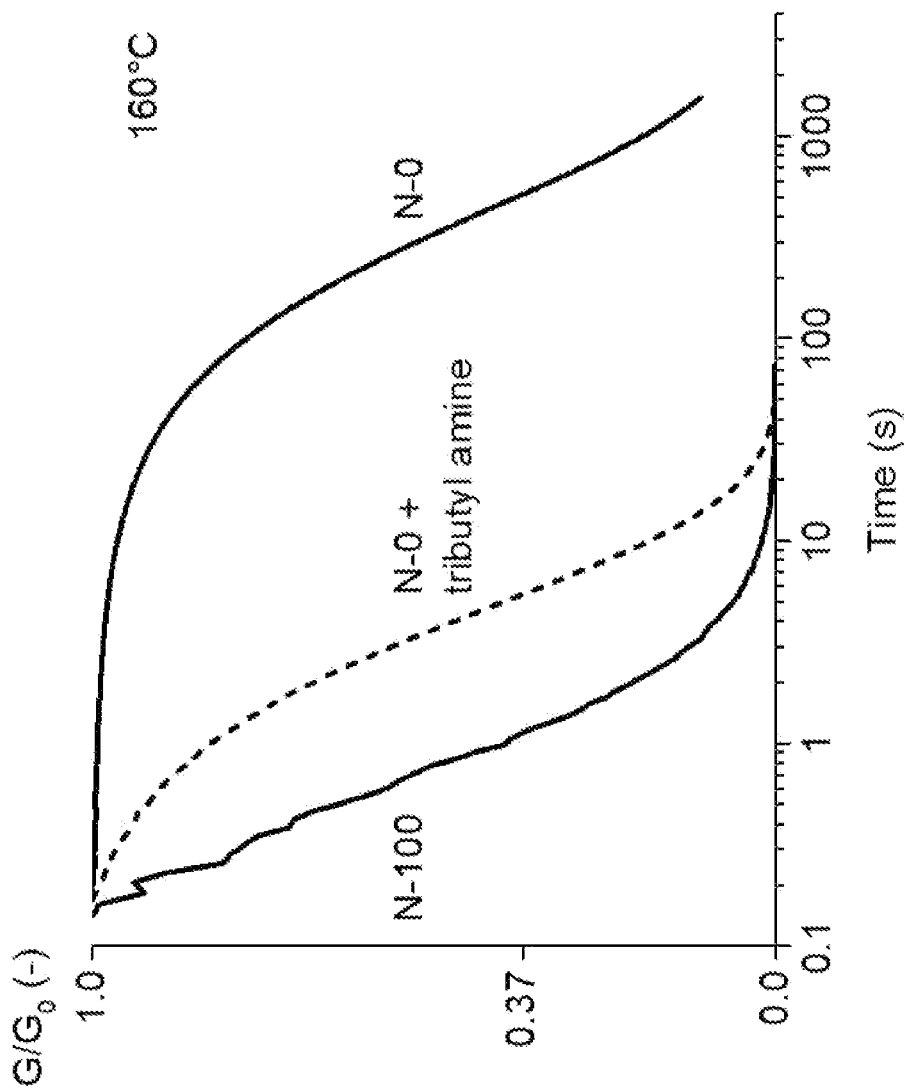
FIG. 5 compares the stress-relaxation curves at 160° C. of a composition having no amine (N-0), a composition having an internal tertiary amine (N-100) and a composition having an external amine (N-0+tributyl amine)

The above described results show an acceleration of the transesterification of a composition according to the present invention. Although applicant does not want to be bound by any theory, the acceleration seems to be due to the double neighbouring group effect. In order to verify the double internal catalysis hypothesis, the stress-relaxation and frequency sweep measurements were determined for a reference material containing the same amount of amine as the N–100 sample but as an external amine. For the reference sample 100% (with respect to diol) of tributyl amine was added to the N–0 formulation. Although an acceleration of the exchange rate was observed for the reference network, the internal amine again exceeded this effect with a factor of five (1.1 s and 5.5 s respectively, see FIG. 5(a)).

In the previously mentioned determination of the dynamic properties stress-relaxtion experiments were used. The data obtained from such a stress-relaxation experiments are typically normalised with respect to the initial relaxation modulus. To do this in a reproducible way, an initial modulus ($G_0$) is determined from the plateau in the beginning of the measurement, as shown for example for N–0 in FIG. 5(a). However, if relaxation is fast ($\tau<10$), this plateau is very small or even absent, which makes the normalisation less convenient and thus the calculation of the relaxation time ($\tau$) less accurate. As exemplified in the relaxation curve of N–100 ($\tau\sim1.1$ s) in FIG. 5(a), the ultra-fast exchange of the double-NGP networks resulted in relaxation curves without such initial plateau.

Figure 6:
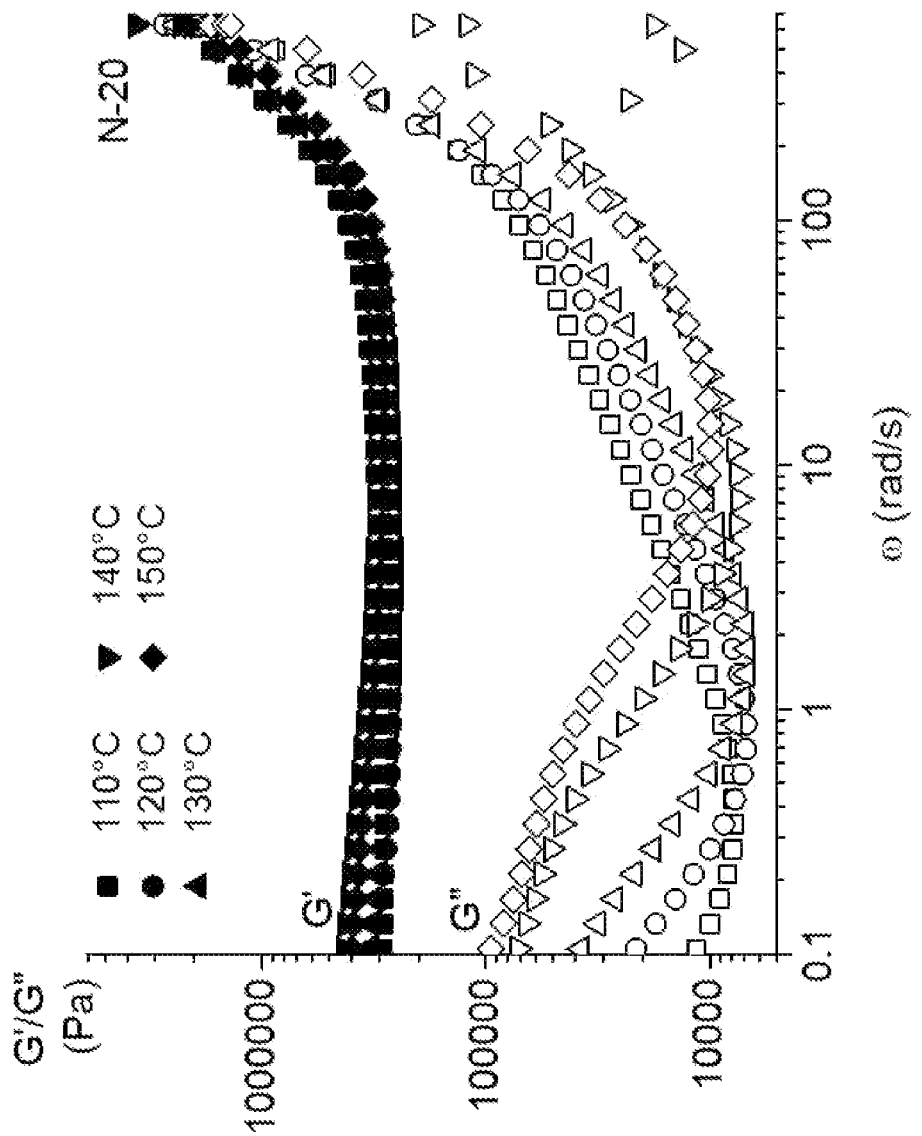
FIG. 6 shows the frequency sweep measurements at different temperatures of N-20.

Alternative to stress-relaxation, frequency sweep experiments can be used to measure the relaxation time, which is then defined as the inverse of the angular frequency ($\omega$) at the cross-over between the storage (G') and loss modulus (G"). Frequency sweeps measurements were performed on N–20, although the transesterification rate in this network was too slow to observe a cross-over (FIG. 6). In this case, the point of interest was the plateau in storage modulus between 1 and 10 rad/s. Because this plateau value remained constant for every temperature, this confirmed that exchange happened without a significant drop in cross-link density.

c. Industrial Relevant Processing

Melt-Flow Index

Extrusion is one of the most important and used techniques in the processing of thermoplastics. As a prerequisite for extrusion, polymer materials need to show sufficient flow at the applied temperatures. Because of the low relaxation times that were obtained, the possibility to use the composition N–100 in industrial processes and in particular in extrusion was explored. The flow of N–100 was determined via a Melt-Flow Index (MFI) measurement using a Zwick 4100 apparatus, where a sample of the network was pushed through a die having a diameter of 2.095 mm at 150° C. under a standardised load of 2.16 kg. Subsequently, the MFI was calculated from the mass that could flow through the die as a function of time. For N–100 at 150° C. a MFI of 6 g/10 min was calculated. It is important to note that the flow had stopped quickly after cooling at the bottom plate, which resulted in a good retention of the shape of the rods.

Extrusion

After the MFI-measurements of N–100, which showed sufficient flow, processing via extrusion was attempted with the use of a double-screw mini-extruder (Haake Minilab of Thermo Scientific) at 150° C. Initially, a speed of 5 rpm was applied, which yielded a homogeneous extrudate. At higher speeds some defects were observed. Nevertheless, the extrusion experiments provided an interesting proof of concept to process the double NGP networks according to the present invention.

Determination of Network Dissociation During Processing

In the MFI-measurement and extrusion, viscous flow was observed for N-100 at 150° C. Interestingly, in both experiments, no further flow was observed when the applied heat and pressure were removed, which enabled a good retention of the obtained shape.

Although applicant does not want to be bound by any theory it is assumed that the ultra-fast relaxation that was observed for N-100 (and other double-NGP networks) was caused by a fast reshuffling of the cross-links rather than a decross-linking. This explains the stable shape of the network after processing and avoids the need of an additional heating step afterwards to 're-cure' the material.

Example 2

Figure 7:
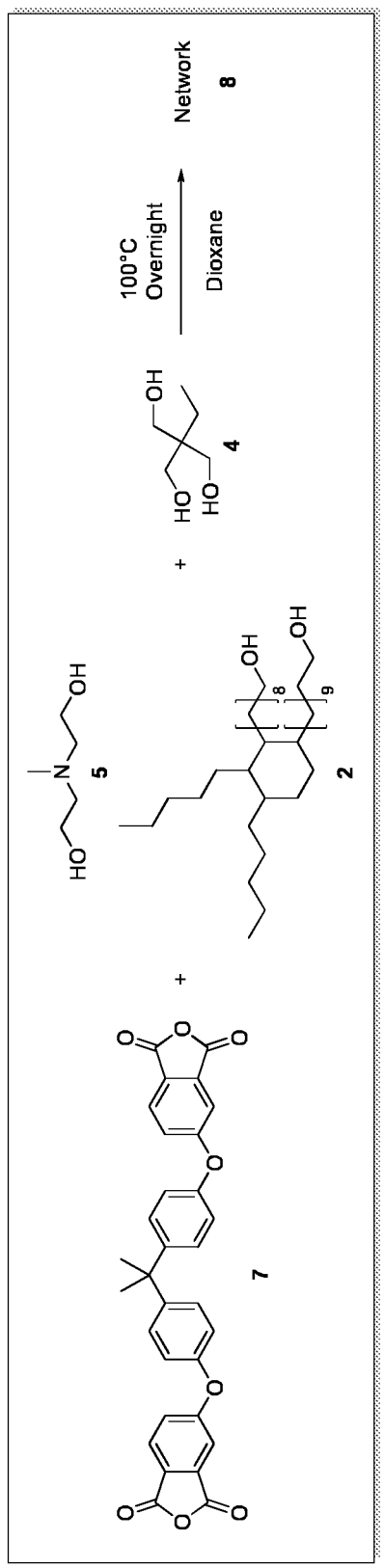
FIG. 7 shows a further strategy for the synthesis of a polymer according to the present invention.

FIG. 7 shows the synthesis of a network 8 according to the present invention by adding a polyol mixture comprising N-methyl diethanolamine (MDEA, 5) and optionally Pripol 2033 (2) and trimethylolpropane (TMP, 4) to 4,4'-(4,4'-Isopropylidenediphenoxy)bis(phthalic anhydride) (bisphenol A dianhydride, 7) using dioxane as solvent.

The ratio of MDEA and Pripol 2033 in the polyol mixture was varied according to the amounts specified in Table 2. The resulting networks were named P-x, where x denotes the percentage of Pripol 2033 in the mixture of MDEA and Pripol 2033.

More Details about the General Synthesis Method are Given Below:

The required amounts of MDEA, Pripol 2033, and TMP as specified in Table 2 were dissolved in 5 mL dioxane in a plastic cup (SpeedMixer®). Solid bisphenol A dianhydride (9.61 mmol) was added and the monomers were mixed using a SpeedMixer® (2500 rpm, 120 s). The resulting mixture was heated to 100° C. for 10 min under ambient atmosphere after which the mixing step was repeated. The heating and mixing step was repeated once or optionally twice to obtain a homogeneous solid or highly viscous liquid. The mixture was heated a further 40 min to 100° C. under ambient atmosphere, followed by a curing under vacuum at 100° C. overnight (approximately 16 h). The obtained (foamed) network was ground to a fine powder and finally heated to 160° C. for 60 min under ambient atmosphere to remove the last traces of solvent.

TABLE 2

| Network | Bisphenol A dianhydride (mmol) | MDEA (mmol) | Pripol 2033 (mmol) | TMP (mmol) | $T_g$ (° C.) | $T_{deg,\ 5\%}$ (° C.) |
| --- | --- | --- | --- | --- | --- | --- |
| P-0 | 9.61 | 3.84 | 0 | 3.84 | 154 | 311 |
| P-10 | 9.61 | 3.46 | 0.38 | 3.84 | 146 | 299 |
| P-20 | 9.61 | 3.07 | 0.77 | 3.84 | 140 | 279 |
| P-30 | 9.61 | 2.69 | 1.15 | 3.84 | 136 | 283 |
| P-40 | 9.61 | 2.31 | 1.54 | 3.84 | 126 | 324 |
| P-50 | 9.61 | 1.92 | 1.92 | 3.84 | 117 | 341 |

To evaluate the materials, their glass transition temperature and degradation temperature were determined via dynamic scanning calorimetry (DSC) and thermogravimetric analysis (TGA), respectively.

Figure 8:
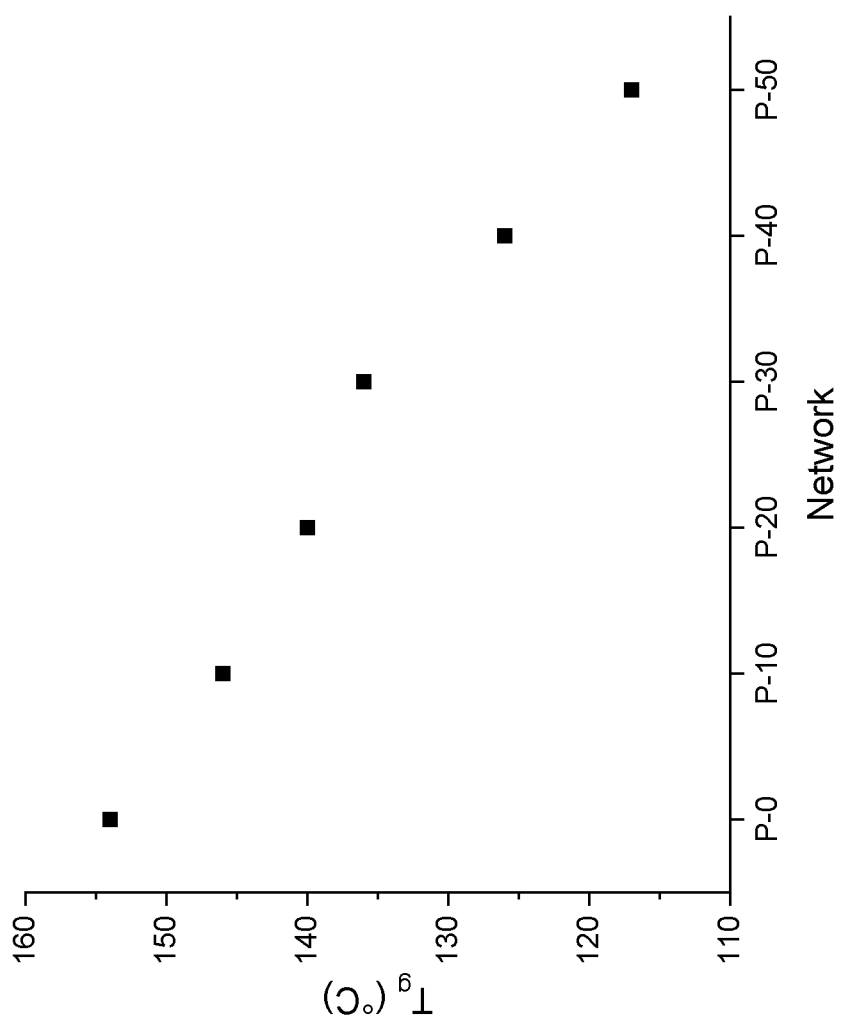
FIG. 8 shows the glass transition temperature of different networks having an increased amount of Pripol 2033 in the polyol mixture synthesized according to the strategy shown in FIG. 7.

DSC analyses were performed with a Mettler-Toledo 1/700 under nitrogen atmosphere. The samples were analyzed in aluminium sample pans which contained 5-20 mg of the sample. The samples were heated from an initial temperature to 150° C., cooled to the initial temperature, heated to 200° C., cooled to the initial temperature and heated to 200° C. The initial temperature was at least 40° C. below the glass transition temperature ($T_g$) of the material and the heating/cooling rate was 10° C.min$^{-1}$. $T_g$'s were determined in the third heating step using the STARe software of Mettler-Toledo. In the case of networks P-x, the initial temperature was 35° C. and the obtained glass transition temperatures are listed in Table 2 and shown in FIG. 8.

Thermogravimetric analyses were performed with a Mettler Toledo TGA/SDTA 851e instrument under nitrogen atmosphere at a heating rate of 10° C. min$^{-1}$ from 25° C. to 800° C. The thermograms were analyzed with the STARe software of Mettler-Toledo. The temperature at which 5% of the initial sample mass had volatilized ($T_{deg}$, 5%) for each network P-x is listed in Table 2.

Example 3

Figure 9:
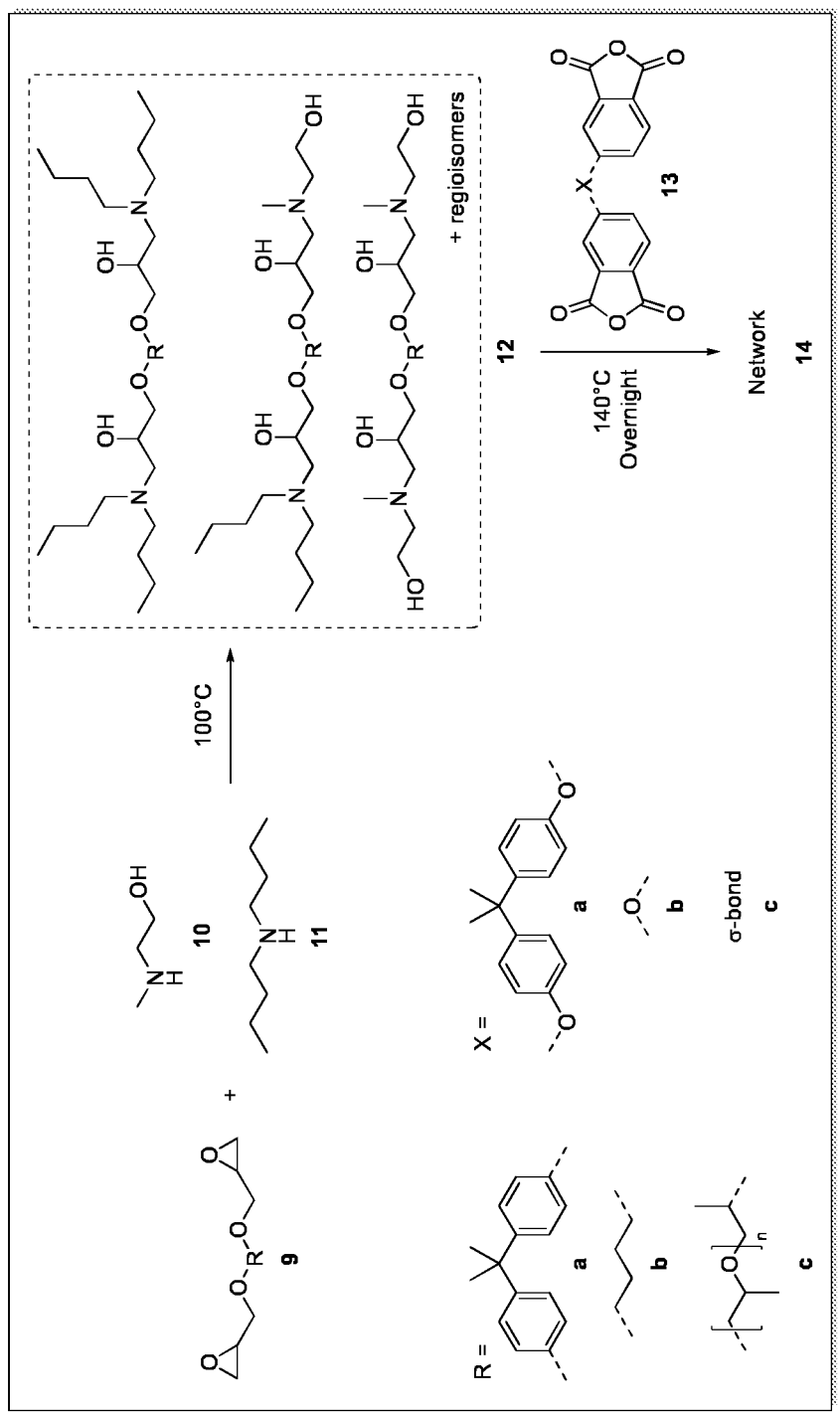
FIG. 9 shows a still a further strategy for the synthesis of a polymer according to the present invention.

FIG. 9 shows the synthesis of a network 14 according to the present invention by first reacting N-methylethanolamine (NMEA, 10) and/or dibutylamine (DBA, 11) with a molecule 9 comprising two epoxide groups. The produced polyol mixture 12 is then mixed with a dianhydride monomer 13 to obtain network 14.

Epoxide 9 comprises for example bisphenol A diglycidyl ether (9a), 1,4-butanediol diglycidyl ether (9b), or poly (propylene glycol) diglycidyl ether (Mn=380 g/mol, 9c). Corresponding polyol mixtures 12a, 12b, or 12c with an average alcohol functionality of 2.5 were obtained by mixing the respective epoxide 9 with NMEA and DBA according to the amounts specified in Table 3. Dianhydride monomer 13 comprises for example 4,4'-(4,4'-Isopropylidenediphenoxy)bis(phthalic anhydride) (13a), 4,4'-oxydiphthalic anhydride (13b), 3,3',4,4'-biphenyltetracarboxylic dianhydride (13c). The networks were named 14xy where x denotes the used polyol 12x and y denotes the used dianhydride monomer 13y and were obtained by mixing the respective compounds according to the amounts specified in Table 4.

More Details about the General Synthesis Method are Given Below:

The required amounts of epoxide 9, NMEA, and DBA as specified in Table 3 were mixed and heated to 100° C. overnight in a closed glass vial, after which the mixture was allowed to cool to room temperature. Next, finely ground dianhydride monomer 13 was added to an aliquot of the obtained polyol 12 according to the amounts specified in Table 4 in a plastic cup (SpeedMixer®) and mixed using a SpeedMixer® (2500 rpm, 120 s). The resulting mixture was heated to 100° C. for 10 min under ambient atmosphere after which the mixing step was repeated. The heating and mixing step was repeated once to obtain a homogeneously dispersed anhydride. The highly viscous to solid mixture was heated a further 40 min to 100° C. under ambient atmosphere, followed by a curing under vacuum at 140° C. overnight (approximately 16 h). The obtained (foamed) network was ground to a fine powder.

TABLE 3

| Polyol | Epoxide 9 (mmol) | NMEA (mmol) | DBA (mmol) | Equivalent weight (OH, g/mol) |
|---|---|---|---|---|
| 12a | 29.38 (9a) | 14.69 | 44.06 | 228.74 |
| 12b | 49.44 (9b) | 24.72 | 74.17 | 173.47 |
| 12c | 52.63 (9c) | 26.32 | 78.95 | 244.57 |

TABLE 4

| Network | Polyol 12 (g) | Dianhydride 13 (mmol) | Dianhydride 13 (g) | $T_g$ (° C.) | $T_{deg,\,5\%}$ (° C.) | $T_{press}$ (° C.) |
|---|---|---|---|---|---|---|
| 14aa | 2.197 (12a) | 4.80 (13a) | 2.500 (13a) | 106 | 321 | 180 |
| 14ab | 3.687 (12a) | 8.06 (13b) | 2.500 (13b) | 127 | 287 | 180 |
| 14ac | 3.887 (12a) | 8.50 (13c) | 2.500 (13c) | 138 | 288 | 180 |
| 14ba | 1.666 (12b) | 4.80 (13a) | 2.500 (13a) | 89 | 308 | 150 |
| 14bb | 2.796 (12b) | 8.06 (13b) | 2.500 (13b) | 105 | 278 | 180 |
| 14bc | 2.948 (12b) | 8.50 (13c) | 2.500 (13c) | 121 | 276 | 180 |
| 14ca | 2.349 (12c) | 4.80 (13a) | 2.500 (13a) | 102 | 257 | 150 |
| 14cb | 3.942 (12c) | 8.06 (13b) | 2.500 (13b) | 99 | 244 | 180 |
| 14cc | 4.156 (12c) | 8.50 (13c) | 2.500 (13c) | 117 | 248 | 180 |

To evaluate the materials, their glass transition temperature ($T_g$) and degradation temperature ($T_{deg}$, 5%) were determined via dynamic scanning calorimetry (DSC) and thermogravimetric analysis (TGA), respectively, as detailed in example 2. The resulting values are listed in Table 4.

All the ground networks could be pressed into a homogeneous and semi-transparent network using a hot press at 4 metric tons for 15-30 min at a temperature above the $T_g$ of the material ($T_{press}$, Table 4).

Example 4

A network according to the present invention is synthesized according to the strategy and experimental procedure detailed in example 3 whereby the dianhydride monomer 13 is replaced with an alternative dianhydride monomer comprising a cyclic or aromatic structure with at least two anhydride groups as substituents, for example pyromellitic dianhydride (PMDA), bicyclo[2.2.2]oct-7-ene-2,3,5,6-tetracarboxylic dianhydride (BCODA), and 1,4,5,8-naphthalenetetracarboxylic dianhydride (NTCDA). Optionally, the polyol 12 can be diluted with a solvent, for example dioxane or N-methyl-2-pyrrolidone (NMP), prior to addition of said dianhydride monomer.

Networks were obtained by processing the precursors of polyol 12, PMDA or BCODA or NTCDA as dianhydride monomer and optional solvent according to the amounts specified in Table and as detailed in example 3. If NMP is added as solvent, the heating steps under ambient atmosphere of the mixture of polyol, dianhydride monomer, and NMP are performed at 120° C. instead of 100° C. and the heating and mixing step was repeated until a clear solution was obtained.

TABLE 5

| Entry | Polyol 12 | Dianhydride monomer | Solvent | $T_g$ (° C.) | $T_{deg,\,5\%}$ (° C.) | $T_{press}$ (° C.) |
|---|---|---|---|---|---|---|
| 1 | 5.243 g 12a | 2.500 g PMDA | None | 151 | 262 | 180 |
| 2 | 4.608 g 12a | 2.500 g BCODA | 5 mL NMP | 85 | 215 | 150 |
| 3 | 4.265 g 12a | 2.500 g NTCDA | None | 42 | 272 | 120 |
| 4 | 3.977 g 12b | 2.500 g PMDA | 2.5 mL NMP | 120 | 237 | 180 |
| 5 | 3.495 g 12b | 2.500 g BCODA | 2.5 mL dioxane | 49 | 293 | 140 |
| 6 | 5.606 g 12c | 2.500 g PMDA | None | 117 | 232 | 150 |
| 7 | 4.927 g 12c | 2.500 g BCODA | 2.5 mL dioxane | 50 | 254 | 140 |

To evaluate the materials, their glass transition temperature (Tg) and degradation temperature (Tdeg, 5%) were determined via dynamic scanning calorimetry (DSC) and thermogravimetric analysis (TGA), respectively, as detailed in example 2. The resulting values are listed in Table 5.

All the ground networks could be pressed into a homogeneous and semi-transparent network using a hot press at 4 metric tons for 15-30 min at a temperature above the $T_g$ of the material ($T_{press}$, Table 5).

Example 5

A network according to the present invention is synthesized according to the strategy and experimental procedure detailed in example 3 whereby the dianhydride monomer 13 is replaced with an alternative monomer comprising at least two pairs of carboxyl groups, for example 1,2,3,4-cyclopentanetetracarboxylic acid (CPTA) and 1,2,3,4-butanetetracarboxylic acid (BTA). Optionally, the polyol 12 can be diluted with a solvent, for example N-methyl-2-pyrrolidone (NMP), prior to addition of said monomer.

Networks were obtained by using the precursors of polyol 12, CPTA or BTA as replacement of dianhydride monomer 13 and optional solvent according to the amounts specified in Table 6. The compounds were processed as described in detail in example 3 whereby the heating steps under ambient atmosphere were performed at 120° C. instead of 100° C. and increased in length from 10 min to 30 min and from 40 min to 90 min, respectively.

TABLE 6

| Entry | Polyol 12 | Dianhydride monomer | Solvent | $T_g$ (° C.) | $T_{deg,\,5\%}$ (° C.) | $T_{press}$ (° C.) |
|---|---|---|---|---|---|---|
| 1 | 4.646 g 12a | 2.500 g CPTA | None | 115 | 271 | 180 |
| 2 | 4.884 g 12a | 2.500 g BTA | 2.5 mL NMP | 74 | 246 | 150 |

To evaluate the materials, their glass transition temperature ($T_g$) and degradation temperature ($T_{deg}$, 5%) were determined via dynamic scanning calorimetry (DSC) and thermogravimetric analysis (TGA), respectively, as detailed in example 2. The resulting values are listed in Table 6.

All the ground networks could be pressed into a homogeneous and semi-transparent network using a hot press at 4 metric tons for 15-30 min at a temperature above the $T_g$ of the material ($T_{press}$, Table 6).

The invention claimed is:
1. A method to prepare a polymer or to prepare a precursor for a polymer, said method comprising the steps of
   a) providing at least one compound Y comprising a first functional group and a second functional group,
      said first functional group comprising an anhydride group, a pair of carboxyl groups or a pair of derivatives of a carboxyl group, said anhydride group, said pair of carboxyl groups or said pair of derivatives of a carboxylic group of said first functional group comprising a first carbonyl group, a second carbonyl group, a first carbon atom positioned next to said first carbonyl group, a second carbon atom positioned next to said second carbonyl group and optionally a third carbon atom positioned between said first carbon atom and said second carbon atom, said first carbon atom, said second carbon atom and said optional third carbon atom being independently from each other substituted or non-substituted and, said second functional group comprising a polymerisable group P1, whereby in case an unsaturated bond is present between said first carbon atom and said second carbon atom, said unsaturated bond between said first carbon atom and said second carbon atom is not considered as polymerisable group P1 of said second functional group and whereby in case the bond between said first carbon atom and said second carbon atom is part of a cyclic or aromatic structure comprising an unsaturated bond in said cyclic or aromatic structure, said unsaturated bond present in said cyclic or aromatic structure is not considered as polymerisable group P1 of said second functional group;

b) providing an alcohol Z or a mixture of alcohols comprising alcohol Z or reacted with alcohol Z, said alcohol Z comprising at least one hydroxyl functional group and at least one polymerisable group P2, said alcohol Z further comprising a nitrogen atom, said nitrogen atom having three substituents comprising at least one carbon atom, said alcohol Z comprising a first carbon atom, a second carbon atom and optionally a third carbon atom between said nitrogen and said at least one hydroxyl functional groups of said alcohol Z, said first carbon atom, said second carbon atom and said optional third carbon atom being independently from each other substituted or non-substituted;

c) contacting said compound Y provided in step a) and said alcohol Z or said mixture of alcohols provided in step b).

2. The method according to claim 1, wherein said polymerisable group P1 of said second functional group of compound Y comprises an unsaturated carbon-carbon, a carboxyl group, an anhydride group, a pair of carboxyl groups or a pair of derivatives of a carboxyl group.

3. The method according to claim 1, wherein said compound Y comprises a polyanhydride comprising at least two cyclic anhydride groups.

4. The method according to claim 1, wherein said polymerisable group P2 of said alcohol Z comprises an unsaturated carbon-carbon bond, a carboxyl group, a derivative of a carboxyl group or a hydroxyl functional group.

5. The method according to claim 1, wherein said compound Z comprises a beta-amino-alcohol having one, two or three hydroxyl functional groups.

6. The method according to claim 1, wherein said compound Y and said alcohol Z are contacted in step c) in a molar ratio of alcohol Z to compound Y lower than 2, whereby the molar ratio is defined in terms of the total number of hydroxyl functional groups of alcohol Z or the total number of hydroxyl functional groups of all alcohols of the mixture of alcohols comprising alcohol Z in case mixture of alcohols is used divided by the total number of anhydride functional groups and pairs of carboxyl groups or derivatives of a carboxyl group of compound Y.

7. The method according to claim 1, wherein said alcohol Z is provided by contacting an amine V and a compound X, said amine V comprising at least one reactive N—H bond and said compound X comprising at least one epoxide group, in a molar ratio V to X ranging between 0.5 and 1.5, said molar ratio being defined in terms of the number of said reactive N—H bonds and the number of said epoxide functional groups.

* * * * *